US009131082B2

(12) United States Patent
Otsuka

(10) Patent No.: US 9,131,082 B2
(45) **Date of Patent: *Sep. 8, 2015**

(54) PRINTER HAVING WEB SERVER FUNCTION

(71) Applicant: Brother Kogyo Kabushiki Kaisha, Nagoya-shi, Aichi-ken (JP)

(72) Inventor: Naoki Otsuka, Konan (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/456,269

(22) Filed: Aug. 11, 2014

(65) Prior Publication Data

US 2014/0347694 A1 Nov. 27, 2014

Related U.S. Application Data

(62) Division of application No. 12/567,016, filed on Sep. 25, 2009, now Pat. No. 8,836,972.

(30) Foreign Application Priority Data

Sep. 30, 2008 (JP) ................................ 2008-252495
Sep. 30, 2008 (JP) ................................ 2008-252496
Sep. 30, 2008 (JP) ................................ 2008-252497

(51) Int. Cl.
*H04N 1/00* (2006.01)
*G06F 3/12* (2006.01)
(Continued)

(52) U.S. Cl.
CPC .......... *H04N 1/00244* (2013.01); *G06F 3/1293* (2013.01); *G06F 3/1294* (2013.01);
(Continued)

(58) Field of Classification Search
USPC .......... 358/1.13, 1.14, 1.15, 1.16, 1.17, 1.18; 715/205, 228, 227; 717/162
See application file for complete search history.

(56) References Cited

U.S. PATENT DOCUMENTS 7,437,660 B1 10/2008 Mehta et al.
2003/0140095 A1 7/2003 Simpson et al.
(Continued)

FOREIGN PATENT DOCUMENTS

CA 2400808 A1 8/2001
JP 10-269039 10/1998
(Continued)

OTHER PUBLICATIONS

Jan. 21, 2015—(US) Notice of Allowance—U.S. Appl. No. 14/456,363.
(Continued)

*Primary Examiner* — Allen H Nguyen
(74) *Attorney, Agent, or Firm* — Banner & Witcoff, Ltd.

(57) ABSTRACT

A printer may comprise a command file storage unit, a receiving unit, a command file sending unit, and a first data sending unit. The command file storage unit may store a command file including a first command, a second command, and a third command. The first command is a command for sending a request for first data. The second command includes design data, and is a command for converting the first data into second data in accordance with the design data. The third command is a command for displaying a web page in accordance with the second data. The receiving unit may receive a request. The command file sending unit may send a response including the command file when a request for the command file is received. The first data sending unit may send a response including the first data when the request for the first data is received.

7 Claims, 24 Drawing Sheets

(51) Int. Cl.
*G06F 9/44* (2006.01)
*H04L 29/08* (2006.01)

(52) U.S. Cl.
CPC .............. *G06F9/4445* (2013.01); *H04L 67/02* (2013.01); *H04L 67/025* (2013.01); *H04L 67/34* (2013.01); *H04N 1/00222* (2013.01); *H04N 1/00464* (2013.01); *H04N 1/00204* (2013.01); *H04N 2201/001* (2013.01); *H04N 2201/007* (2013.01); *H04N 2201/0013* (2013.01); *H04N 2201/0094* (2013.01)

(56) References Cited

U.S. PATENT DOCUMENTS

| | | | |
|---|---|---|---|
| 2004/0008372 | A1 | 1/2004 | Akashi et al. |
| 2004/0193887 | A1 | 9/2004 | Foster et al. |
| 2005/0137885 | A1 | 6/2005 | Nohgawa et al. |
| 2006/0053368 | A1 | 3/2006 | Bosworth et al. |
| 2006/0158674 | A1 | 7/2006 | Mizoguchi |
| 2008/0043282 | A1 | 2/2008 | Tsuboi |
| 2008/0082677 | A1 | 4/2008 | Miyazawa et al. |

FOREIGN PATENT DOCUMENTS

| | | | |
|---|---|---|---|
| JP | 11177611 | | 7/1999 |
| JP | 2001273221 | A | 10/2001 |
| JP | 2003186792 | A | 7/2003 |
| JP | 2003231334 | A | 8/2003 |
| JP | 2003337777 | A | 11/2003 |
| JP | 2006172179 | A | 6/2006 |
| JP | 2007156614 | A | 6/2007 |

OTHER PUBLICATIONS

Office Action issued in corresponding European Patent Application No. 11 161 036.6 dated Feb. 21, 2013.

Office Action issued in corresponding European Patent Application No. 11 161 035.8 dated Feb. 21, 2013.

Office Action issued in corresponding European Patent Application No. 11161036.6 mailed Jun. 23, 2014.

Office Action issued in European Patent Application No. 11161035.8 mailed Jun. 23, 2014.

European Search Report mailed on Aug. 5, 2011 in EP Application No. 11161036.6.

Extended European search report for applicatin No. 11161035.8 mailed Aug. 2, 2011.

Notification of Reasons for Rejection for Japanese Patent Application No. 2008-252495, mailed Sep. 28, 2010.

Notification of Reasons for Rejection for Japanese Patent Application No. 2008-252496, mailed Aug. 31, 2010.

European Search Report for Application No. 09252272.1, dated Sep. 6, 2010.

FIG. 5

First Index File 20
(index1.html)

```
<html>
<head>
<script type="text/javascript">
<!--
function loadXML(url)                                   202
{
     httpObj = new XMLHttpRequest();                    204
     httpObj.onload = displayXML;                       206
     httpObj.open("GET", url, true);
     httpObj.send(null);

     return false;
}
                                                        200
function displayXML()                                   210
{
     xml = httpObj.responseXML;
     html = "";
                                                        212
     :
     :    213
     :
                                                        214
     document.getElementById("main").innerHTML = html;
}
//-->
</script>
</head>
```

FIG. 6

First Index File 20
(index1.html)

```
    <body onLoad="loadXML('top. xml ')">  ← 218
   ┌<div id="menu">  ← 220
   │  :
222┤  <a href="#" onClick="loadXML('configure_tcpip. xml ')">Configure TCP/IP</a><br>  ← 224
   │  :
   └</div>
   ┌<div id="main">  ← 230
232┤  :
   │  :
   └</div>
   ┌<div id="footer">  ← 240
242┤  :
   │  :
   └</div>
    </body>
    </html>
```

FIG. 7

XML File 250
(configure_tcpip.xml)

```
<?xml version="1.0" encoding="UTF-8" ?>  ← 252
<page>
  <title>Configure TCP/IP</title>  ← 254
  <form>
260 ┌ <item>
    │   <title>TCP/IP</title>  ← 262
    │   <input type="radio">  ← 264
    │     <name>tcpip</name>
    │     <radio value="enable" checked="yes">Enable</radio>  ← 266
    │     <radio value="disable">Disable</radio>  ← 268
    │   </input>
    └ </item>
270 ┌ <item>
    │   <title>IP Address</title>  ← 272
    │   <input type="text">  ← 274
    │     <name>ip_address</name>
    │     <value>XX.XXX.XXX.XX</value>  ← 276
    │   </input>
    └ </item>
280 ┌ <item>
    │   <title>Subnet Mask</title>  ← 282
    │   <input type="text">  ← 284
    │     <name>subnet_mask</name>
    │     <value>YYY.YYY.Y.Y</value>  ← 286
    │   </input>
    └ </item>
```

FIG. 8

XML File 250
(configure_tcpip.xml)

```
     <item>
       <title>Gateway</title>  ← 292
       <input type="text">  ← 294
290      <name>gateway</name>
         <value>ZZ.ZZZ.ZZZ.ZZZ</value>  ← 296
       </input>
     </item>
     <item>
       <title>Boot Method</title>  ← 302
       <input type="select">  ← 304
         <name>boot_method</name>
300      <option value="auto"selected>AUTO</option>
         <option value="dhcp">DHCP</option>           306
         <option value="bootp">BOOTP</option>
       </input>
     </item>
```

FIG. 14

Index File 1020 (index.html)

```
<html>
<head>
<script type="text/javascript"src="load.js"></script>  <-- 1202
<script type="text/javascript"src="post_request.js"></script>  <-- 1204
<script type="text/javascript"src="post.js"></script>  <-- 1206
</head>
<body>
1212 { <div id="menu">  <-- 1210
         :
         <a href="#" onClick="loadMain( 'fax settings.html' )">Fax Settings</a><br>  1214
         <a href="#" onClick="loadMain( 'copy settings.html' )">Copy Settings</a><br>  1216
         :
     </div>
1222 { <div id="main">  <-- 1220
         :
         <a href="#" onClick="loadSettings( 'set auto dial.html' )">Set Auto Dial</a><br>  1224
         <a href="#" onClick="loadSettings( 'report settings.html' )">Report Settings</a><br>  1226
         :
         <div id="settings">  <-- 1230 } 1232
           :
         </div>
         :
     </div>
1242 { <div id="footer">  <-- 1240
         :
     </div>
</body>
</html>
```

FIG. 15

Load File 1250 (load.js)

```
function loadMain(url) <-- 1260
{
    httpObj = new XMLHttpRequest(); <-- 1262
    httpObj.onload = displayMain; <-- 1264
    httpObj.open("GET", url, true);
    httpObj.send(null);

    return false;
}

function displayMain() <-- 1270
{
    document.getElementById("main").innerHTML = httpObj.responseText;   1272
}

function loadSettings(url) <-- 1280
{
    httpObj = new XMLHttpRequest(); <-- 1282
    httpObj.onload = displaySettings; <-- 1284
    httpObj.open("GET", url, true);
    httpObj.send(null);

    return false;
}

function displaySettings() <-- 1290
{
    document.getElementById("settings").innerHTML = httpObj.responseText;   1292
}
```

FIG. 16

Post File 1300 (post.js)

```
function post_fax_settings () <— 1310
{
  var data = "fs_param1=" + encodeURI( document.getElementById("fs_param1").value ) +      ⎫
                "&fs_param2=" + encodeURI( document.getElementById("fs_param2").value ) +  ⎬ 1312
                 :                                                                          ⎪
                "&fs_paramN=" + encodeURI( document.getElementById("fs_paramN").value );   ⎭
  post_request('post_fax_settings.cgi', data, 'main'); <— 1314
}

function post_copy_settings () <— 1320
{
  var data = "cs_param1=" + encodeURI( document.getElementById("cs_param1").value ) +      ⎫
                "&cs_param2="+ encodeURI( document.getElementById("cs_param2").value ) +   ⎬ 1322
                 :                                                                          ⎪
                "&cs_paramN=" + encodeURI( document.getElementById("cs_paramN").value );   ⎭
  post_request('post_copy_settings.cgi', data, 'main'); <— 1324
}

:
:
:
```

Post Request File 1330 (post_request.js)

1332

```
function post_request(url, data, id)
{
  http_request = false;
  if (window.XMLHttpRequest)          // for Mozilla, Safari,...
  {
    http_request = new XMLHttpRequest();
    if (http_request.overrideMimeType)
    {
      http_request.overrideMimeType('text/html');
    }
  }
  else if (window.ActiveXObject)      // for IE
  {
    try
    {
      http_request = new ActiveXObject("Msxml2.XMLHTTP");
    }
      catch (e)
      {
      try
        {
        http_request = new ActiveXObject("Microsoft.XMLHTTP");
      } catch (e) {}
    }
  }
  if (!http_request)
  {
    // error
    return false;
  }

  http_request.onreadystatechange = get_response(id);   <-- 1334
  http_request.open('POST', url, true);
  http_request.setRequestHeader("Content-type", "application/x-www-form-urlencoded");
  http_request.setRequestHeader("Content-length", data.length);
  http_request.setRequestHeader("Connection", "close");
  http_request.send(data);   <-- 1336
}
```

FIG. 18

Post Request File 1330
(post_request.js)

```
function get_response(id)   <- 1340
{
  if (http_request.readyState == 4)
  {
   if (http_request.status == 200)
    {
    result = http_request.responseText;
    document.getElementById(id).innerHTML = result;
   }
    else
    {
    document.getElementById(id).innerHTML="error";
    }
  }
}
```

Status File 1500 (status.html)

```
<html>
<head>
<script type="text/javascript">
<!--
setInterval("getStatus()", 15 * 1000);  ← 1510

function getStatus()  ← 1520
{
    httpObj = new XMLHttpRequest();  ← 1522
    httpObj.onload = displayStatus;  ← 1524
    httpObj.open("GET", "status.txt", true);
    httpObj.send(null);
}

function displayStatus()  ← 1530
{
    document.getElementById("status").innerText = httpObj.responseText;
}                                                        1532
// -->
</script>
</head>
<body>
  :
  :
  :
  :
<div id="status">Sleep</div>  ← 1540
  :
  :
  :
  :
</body>
</html>
```

FIG. 23

Status File 1500a (status.html)

```
<html>
<head>
<script type="text/javascript">
<!--
setInterval("getStatus()", 15 * 1000); <-1510

function getStatus() <-1520
{
      httpObj = new XMLHttpRequest(); <-1522
      httpObj.onload = displayStatus; <-1524
      httpObj.open("GET", "status.txt?status=" + document.getElementById("status").innerText, true);   (1526)
      httpObj.send(null);
}

function displayStatus() <-1530
{
      if (httpObj.responseText != "") <-1536
      {
            document.getElementById("status").innerText = httpObj.responseText; <-1532
      }
}
// -->
</script>
</head>
<body>
  :
<div id="status">Sleep</div> <-1540
  :
</body>
</html>
```

FIG. 25

Index File 1020a (index.html)

```
<html>
<head>
<script type="text/javascript" src="switch_page.js"></script>   ← 2402
<script type="text/javascript" src="post_request.js"></script>  ← 2404
<script type="text/javascript" src="post.js"></script>          ← 2406
</head>
<body>
2412 {
<div id="menu">   ← 2410
  :
<a href="#" onClick="switchPage ('fax_settings')">Fax Settings</a><br>     ← 2414
<a href="#" onClick="switchPage ('copy_settings')">Copy Settings</a><br>   ← 2416
  :
}
</div>
2422 {
<div id="main">   ← 2420
  :

 <div id="fax_settings">   ← 2430
   <form action="javascript:post_fax_settings();" name="form_fax_settings"
id="form_fax_settings">
     :
   </form>                                                    } 2432
 </div>
 <div id="copy_settings">   ← 2440
   <form action="javascript:post_copy_settings();" name="form_copy_settings"
id="form_copy_settings">
     :
   </form>                                                    } 2442
 </div>
 :
}
</div>
2452 {
<div id="footer">   ← 2450
 :
}
</div>
</body>
</html>
```

FIG. 26

Page File 2500
(switch_page.js)

```
function switchPage (id)  <-- 2502
{
  if (typeof (div) == "undefined")
  {

    main = document.getElementById ("main");                  ⎫
    pages = main.getElementsByTagName ("div");                ⎬ 2504
    for (i = 0; i < pages.length; i++)                        ⎪
    {                                                         ⎭
      pages[i].style.display = "none";
    }
  }
  else
  {

    div.style.display = "none";  <-- 2506
  }

  div = document.getElementById (id);   ⎫ 2508
  div.style.display = "block";          ⎭

  return false;
}
```

FIG. 27

Index File 1020b
(index.html)

```
<html>
<head>
<script type="text/javascript" src="switch_page.js"></script>      <-- 2552
<script type="text/javascript" src="post_request.js"></script>     <-- 2554
<script type="text/javascript" src="post.js"></script>             <-- 2556
</head>
<body onLoad="save()">                                             <-- 2560
<div id="menu">
  :
<a href="#" onClick="switchPage ('fax_settings')">Fax Settings</a><br>      <-- 2562
<a href="#" onClick="switchPage ('copy_settings')">Copy Settings</a><br>    <-- 2564
  :
</div>
<form action="javascript:post();" name="form" id="form">          <-- 2570   ┐
<div id="main">                                                             │
  :                                                                         │
  <div id="fax_settings">                                          <-- 2580 │
     :                                                                      │
  </div>                                                                    │ 2572
  <div id="copy_settings">                                         <-- 2590 │
     :                                                                      │
  </div>                                                                    │
  :                                                                         │
</div>                                                                      │
</form>                                                                     ┘
<div id="footer">
  :
</div>
</body>
</html>
```

FIG. 28

Post File 2300a
(post.js)

```
function post ()
{
  var data = " ";

  if (save_param1 != param1)
  {
    data += "param1=" + encodeURI( document.getElementById("param1").value );
  }
  if (save_param2 != param2)
  {
    if (data != " ") data += "&";
    data += "param2=" + encodeURI( document.getElementById("param2").value );
  }
  :
  :
  if (save_paramN != paramN)
  {
    if (data != " ") data += "&";
    data += "paramN=" + encodeURI( document.getElementById("paramN").value );
  }
  post_request('post.cgi', data, 'main');
}
```

2600

```
function save ()
{
    save_param1 = document.getElementById("param1").value;
    save_param2 = document.getElementById("param2").value;
    :
    :
    save_paramN = document.getElementById("paramN").value;
{
```

2620

PRINTER HAVING WEB SERVER FUNCTION

CROSS-REFERENCE TO RELATED APPLICATION

This application is a divisional application of U.S. patent application Ser. No. 12/567,016 filed Sep. 25, 2009, which claims priority to Japanese Patent Application No. 2008-252495 filed on Sep. 30, 2008, No. 2008-252496 filed on Sep. 30, 2008, and No. 2008-252497 filed on Sep. 30, 2008. The contents of the aforementioned applications are hereby incorporated by reference into the present application in their entirety.

BACKGROUND

1. Field

The techniques disclosed in this specification relate to a printer having a web server function. The term "printer" as used herein means a device having at least a print function, and is of a concept including devices having other functions (for example, scan function, FAX function, etc.) in addition to the print function.

2. Description of the Related Art

A system of publicizing information such as a print history or status of a printer on the Internet is well known. With this system, the printer and a web server are configured separately. The web server accumulates various types of information concerning the printer. When the web server receives a request from a terminal device such as a personal computer (hereinafter referred to as a "PC"), the web server creates a file in HTML format, and sends a response including that file. The web browser of the terminal device displays a web page based on the file in HTML format.

BRIEF SUMMARY

The present inventor is involved in the development of printers having a web server function. Preferably, the load required by the printer to execute the web server function is small. This is because, since the primary function of the printer is the print function, it would be undesirable for many of the resources to be occupied by the web server function. This specification provides a technology capable of reducing the load required by the printer to execute the web server function.

A considerable load is required to execute the operation of creating files including the web page design (for example, position, color, font, etc.). The present inventor discovered that the load of the printer can be reduced by shifting the execution of the foregoing operation to an external apparatus (PC or the like) that sends a request to the printer. The technology disclosed in this specification was devised in light of the foregoing discovery.

The first aspect of the technology disclosed herein relates to a printer having a web server function. The printer of the first aspect may comprise a command file storage unit, a receiving unit, a command file sending unit, and a first data sending unit. The command file storage unit may be configured to store a command file. The command file includes at least a first command, a second command, and a third command. The first command is a command for sending a request for first data. The second command includes design data for determining a design to be displayed, and is a command for converting the first data into second data in accordance with the design data. The third command is a command for displaying a web page in accordance with the second data. Note that the first command may also be a command for sending a request for the first data when a user executes prescribed operations in an external apparatus (device that is configured separately from the printer) of the destination of the command file. Meanwhile, the first command may also be a command for sending a request for the first data irrespective of the operations to be executed by the user. In the latter case, the first command may be a command for automatically sending a request for the first data that is triggered when the command file is read, or a command for periodically sending a request for the first data. Moreover, the design data may or may not be described in the command file. In the case where the design data is not described in the command file, the second command may include a command for requesting the design data (that is, an external file). This mode is also equivalent to the second command including the design data.

The receiving unit may be configured to receive a request. The command file sending unit may be configured to send a response including the command file in a case where the receiving unit receives a request for the command file. Alternately, the command file sending unit may also send a response including the command file itself that is stored in the command file storage unit. Moreover, the command file sending unit may also create a new command file by adding other data to the command file stored in the command file storage unit, and send a response including the new command file. This mode is also equivalent to sending a response including the command file stored in the command file storage unit. The first data sending unit may be configured to send a response including the first data in a case where the receiving unit receives the request for the first data. The printer may be storing the first data itself, or may create the first data from other data by executing prescribed processing.

The above-described printer may send a response including the command file in response to a request for the command file from the external apparatus (device that is configured separately from the printer). The external apparatus may execute processing according to the respective commands included in the command file. The external apparatus can send a request for the first data according to the first command. Consequently, the printer may send a response including the first data. The external apparatus may convert the first data into the second data according to the second command. The second command includes the design data for determining the design (for example, position, color, font, etc.) to be displayed. The external apparatus can create the second data in which the design to be displayed has been determined. The external apparatus can display a web page including the second data according to the third command. With this printer it is possible to cause the external apparatus to create the second data that the design to be displayed has been determined. The printer is not required to create the second data that the design to be displayed has been determined. Thus, the load required for the printer to execute the web server function can be reduced.

The second aspect of the technology disclosed herein relates to another printer having a web server function. The printer of the second aspect may comprise a command file storage unit, a receiving unit, a command file sending unit, and a third data sending unit. The command file storage unit may be configured to store a command file. The command file includes at least a first command, a second command, and a third command. The first command is a command for displaying a web page including a first portion in which first data is located and a second portion in which second data is located. The second command is a command for sending a request for third data. The third command is a command for updating only the second portion with the third data. Note that the first data and/or the second data may or may not be described in the first command. In the case where the first data and/or the second data is not described in the first command, the first command may include a command for requesting the first data and/or the second data (that is, an external file). Moreover, the second command may also be a command for sending a request for the third data when a user executes prescribed operations in an external apparatus (device that is configured separately from the printer) of the destination of the command file. Meanwhile, the second command may also be a command for sending a request for the third data irrespective of the operations to be executed by the user. In the latter case, the second command may be a command for automatically sending a request for the third data that is triggered when the command file is read, or a command for periodically sending a request for the third data.

The receiving unit may be configured to receive a request. The command file sending unit may be configured to send a response including the command file in a case where the receiving unit receives a request for the command file. Alternately, the command file sending unit may also send a response including the command file itself that is stored in the command file storage unit. Moreover, the command file sending unit may also create a new command file by adding other data to the command file stored in the command file storage unit, and send a response including the new command file. This mode is also equivalent to sending a response including the command file. The third data sending unit may be configured to send a response including the third data in a case where the receiving unit receives the request for the third data. The printer may be storing the third data itself, or create the third data from other data by executing prescribed processing.

The above-described printer may send a response including the command file in response to a request for the command file from the external apparatus. The external apparatus may execute processing according to the respective commands included in the command file. The external apparatus can display the web page including the first portion on which the first data is located and the second portion on which the second data is located according to the first command. The external apparatus can send a request for the third data according to the second command. Subsequently, the external apparatus can update only the second portion with the third data without changing the first portion according to the third command. The printer is not required to send data to be displayed on the first portion when sending a response in response to a request for the third data. This is because it is not necessary to update the first portion. The printer is not required to send data for updating the overall web page, and only needs to send the third data that is required for the update. The load of the printer can thereby be reduced.

The third aspect of the technology disclosed herein relates to yet another printer having a web server function. This printer of the third aspect may comprise a command file storage unit, a setting data storage unit, a receiving unit, a command file sending unit, a determining unit, a setting change unit, and a setting change response sending unit. The command file storage unit may be configured to store a command file. The command file includes at least a first command, a second command, and a third command. The first command is a command for displaying a web page including a first portion in which first data is located and a second portion in which setting input interface display data is located. The second command is a command for sending a setting change request including setting data input in accordance with the setting input interface display data. The third command is a command for updating only the second portion with data corresponding to a response with respect to the setting change request. The first data and/or the setting input interface display data may or may not be described in the first command. In the case where the first data and/or the setting input interface display data is not described in the first command, the first command may include a command for requesting the first data and/or the setting input interface display data (that is, an external file). The setting data storage unit may be configured to store setting data. The setting data may be any type of data which is used by the printer in executing processing. As examples of the setting data, there are the printing resolution, size of printing paper, communication setting to be used for communicating with the external apparatus, and so on.

The receiving unit may be configured to receive a request. The command file sending unit may be configured to send a response including the command file in a case where the receiving unit receives a request for the command file. The command file sending unit may also send a response including the command file itself that is stored in the command file storage unit. Moreover in an alternate configuration, the command file sending unit may also create a new command file by adding other data to the command file stored in the command file storage unit, and send a response including the new command file. This mode is also equivalent to sending a response including the command file stored in the command file storage unit. The determining unit may be configured to determine, in a case where the receiving unit receives a setting change request, whether the setting data included in the setting change request complies with the printer. The setting change unit may be configured to change, in a case where the determining unit makes an affirmative determination, a content stored in the setting data storage unit to the setting data included in the setting change request. The setting change response sending unit may be configured to send a first response in a case where the determining unit makes the affirmative determination, and send a second response which is different from the first response in a case where the determining unit makes a negative determination.

The above-described printer may send a response including the command file in response to a request for the command file from the external apparatus. The external apparatus may execute processing according to the respective commands included in the command file. The external apparatus can display the web page including the first portion in which the first data is located and the second portion in which the second data is located according to the first command. The user can input the setting data according to the setting input interface display data that is displayed on the web page. The external apparatus can send a setting change request including the setting data input by the user according to the second command. If the setting data included in the setting change request is applicable to the printer, the printer changes the memory content of the setting data storage unit (executes a setting change), and sends an affirmative response (first response). According to this technology, the user can change the setting data of the printer on the web page. Meanwhile, if the setting data included in the setting change request is not applicable to the printer, the printer sends a negative response (second response). The external apparatus can update only the second portion with data corresponding to the response command without changing the first portion according to the third. The printer is not required to send data to be displayed on the first portion when sending a response in response to a setting change request. This is because it is not necessary to update the first portion. The printer is not required to send data for updating the overall web page, and only needs to send the data that is required for the update. The load of the printer can thereby be reduced.

BRIEF DESCRIPTION OF THE DRAWINGS

FIG. 5 shows an example of contents of an index file.

FIG. 6 shows subsequent contents of FIG. 5.

FIG. 7 shows an example of contents of an XML file.

FIG. 8 shows subsequent contents of FIG. 7.

FIG. 14 shows an example of the contents of the index file.

FIG. 15 shows an example of contents of a load file.

FIG. 16 shows an example of contents of a post file.

FIG. 17 shows an example of contents of a post request file.

FIG. 18 shows subsequent contents of FIG. 17.

FIG. 22 shows an example of contents of a status file.

FIG. 23 shows an example of the contents of the status file (fourth embodiment).

FIG. 25 shows an example of the contents of the index file (fifth embodiment).

FIG. 26 shows an example of contents of a page file.

FIG. 27 shows an example of the contents of the index file (sixth embodiment).

FIG. 28 shows an example of the contents of the post file.

DETAILED DESCRIPTION OF THE PREFERRED EMBODIMENTS

First Embodiment

Figure 1:
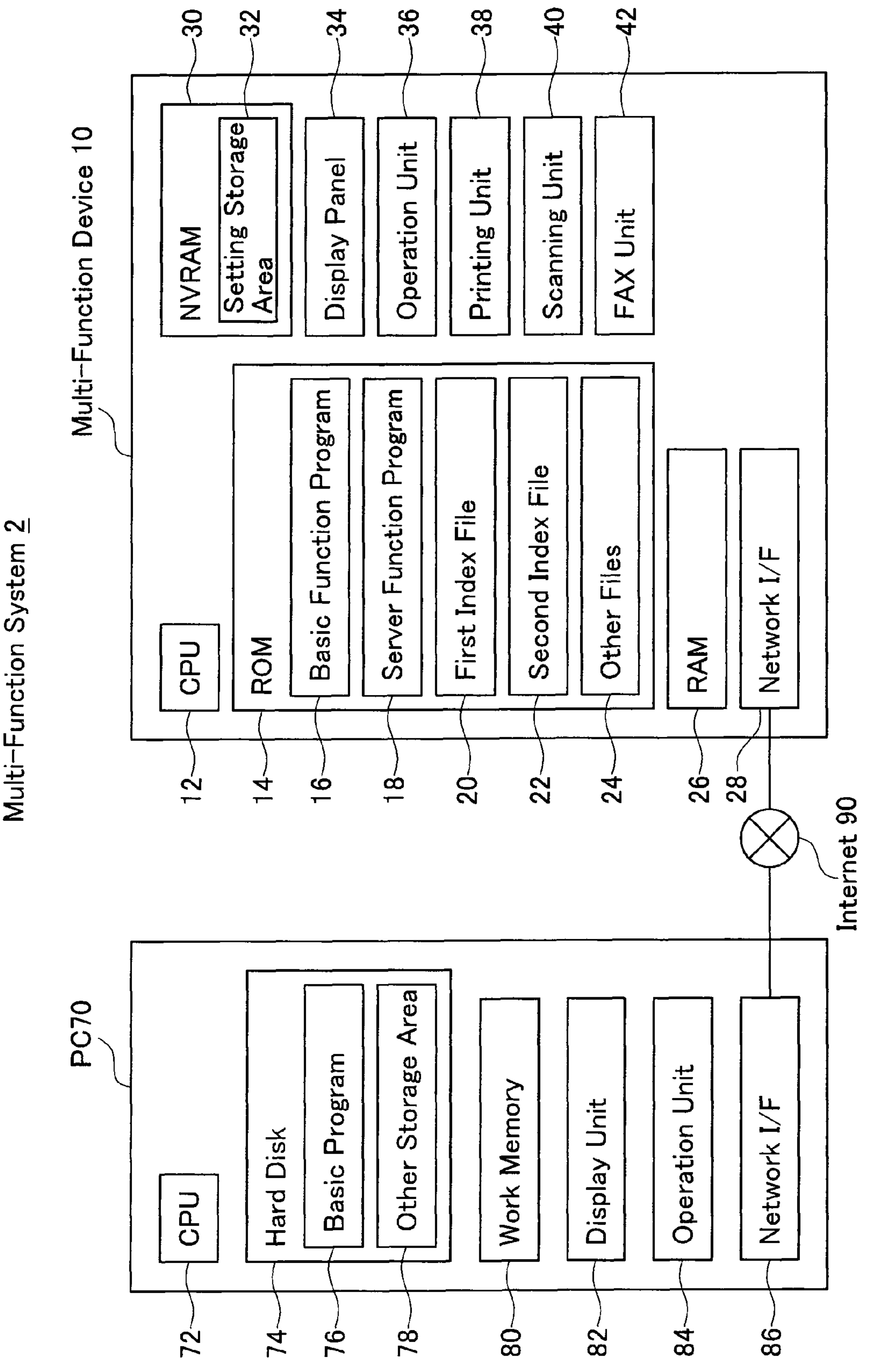
FIG. 1 shows a schematic configuration of a multi-function system.

The first embodiment is now explained with reference to the drawings. FIG. 1 is a schematic diagram showing the multi-function system 2 of the first embodiment. The multi-function system 2 comprises a multi-function device 10, a PC 70 and the like. The multi-function device 10 is connected to the Internet 90. The PC 70 is connected to the Internet 90. The multi-function device 10 and the PC 70 are mutually communicable via the Internet 90. With the multi-function system 2 of the first embodiment, although the multi-function device 10 and the PC 70 are connected via the Internet 90, they may also be connected via a LAN.

(Configuration of PC)

The PC 70 includes a CPU 72, a hard disk 74, a work memory 80, a display unit 82, an operation unit 84, a network I/F 86 and the like. The CPU 72 executes various types of processing according to a program 76 stored in the hard disk 74. The hard disk 74 stores the basic program 76. The basic program 76 is a program for controlling the basic operation of the PC 70. The basic program 76 includes, for instance, a web browser for downloading contents from a site on an Internet 90 and displaying such contents. The hard disk 74 includes another storage area 78 for storing various types of information other than the basic program 76.

The work memory 80 can store data and the like that are created during the course of the CPU 72 executing processing. The display unit 82 can display various types of information. The operation unit 84 is configured from a keyboard, a mouse and the like. The user can input various types of commands and information into the PC 70 by operating the operation unit 84. The network I/F 86 is connected to the Internet 90.

(Configuration of Multi-Function Device)

The multi-function device 10 includes a CPU 12, a ROM 14, a RAM 26, a network I/F 28, an NVRAM 30, a display panel 34, an operation unit 36, a printing unit 38, a scanning unit 40, a facsimile (FAX) unit 42 and the like. The CPU 12 executes various types of processing according to the programs 16, 18 stored in the ROM 14. The processing to be executed by the CPU 12 will be explained in detail later.

The ROM 14 stores various types of programs 16, 18. The basic function program 16 is a program for controlling the basic operation of the multi-function device 10. The basic function program 16 includes, for example, a program for creating display data to be displayed on the display panel 34. Moreover, the basic function program 16 includes, for example, a program for controlling the printing unit 38, the scanning unit 40, the FAX unit 42 and the like. The server function program 18 is a program for functioning as the web server. The specific contents of processing to be realized by the server function program 18 will be explained in detail later. The ROM 14 stores various types of files 20, 22, 24. The files 20, 22 are index files. The specific contents of the index files 20, 22 will be explained in detail later. Moreover, the files 24 are of a file group other than the index files 20, 22. The specific contents of the files 24 will be explained later as needed.

The RAM 26 can store data and the like that are created during the course of the CPU 12 executing processing. The network I/F 28 is connected to the Internet 90. The NVRAM 30 includes a setting storage area 32. The setting storage area 32 is a storage area for storing various types of parameters (for example, network setting, print setting, scan setting, etc.) to be used when the CPU 12 executes processing according to the basic function program 16. The display panel 34 can display various types of information. The operation unit 36 is configured from a plurality of keys. The user can input various types of commands and information into the multi-function device 10 by operating the operation unit 36. The printing unit 38 includes an inkjet printing mechanism, a laser printing mechanism, or the like. The scanning unit 40 includes a reading mechanism of CCD, CIS or the like. The FAX unit 42 executes various types of operations for executing FAX communication.

(Example of Web Page)

Figure 2:
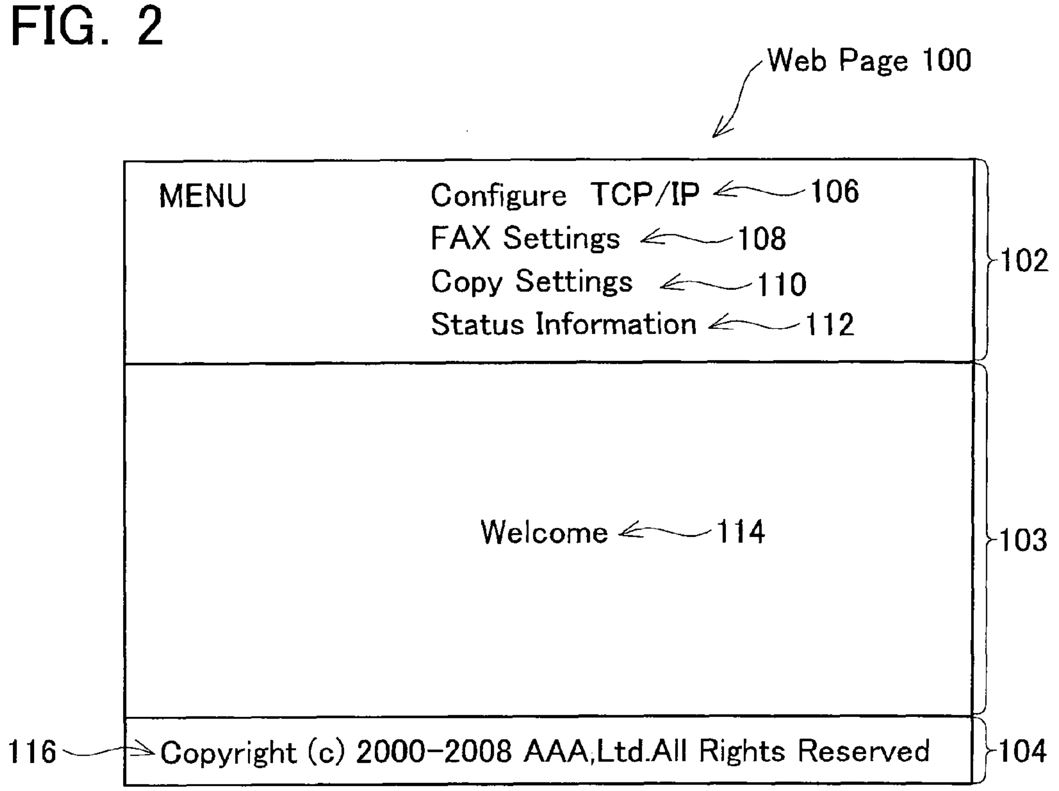
FIG. 2 and FIG. 3 show examples of web pages to be displayed on a PC.

An example of a web page to be displayed on the web browser of the PC 70 is now explained. How a web page is created will be explained in detail after the contents of the web page are explained. The user can input the website URL of the multi-function device 10 into the PC 70 by operating the operation unit 84 of the PC 70. Consequently, the PC 70 sends a GET request to the multi-function device 10, and the multi-function device 10 sends a response. Then, as shown in FIG. 2, the PC 70 displays a web page 100 on the display unit 82. The web page 100 includes a menu section 102, a main section 103, and a footer section 104. The menu section 102 includes a plurality of character strings 106 to 112. The main section 103 includes a character string 114 of "Welcome". The footer section 104 includes a copyright indication 116.

Figure 3:
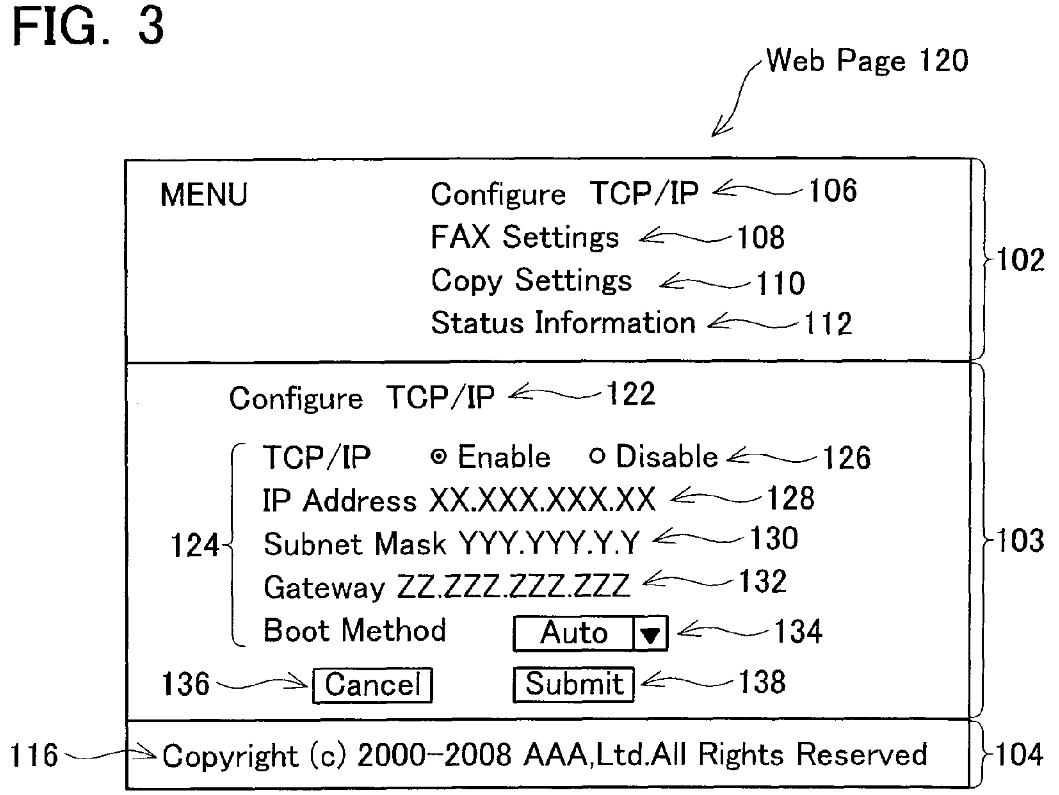

In a state where the web page 100 is displayed on the display unit 82, the user can click any one of the character strings 106 to 112 by operating the operation unit 84. Consequently, the PC 70 sends a GET request to the multi-function device 10, and the multi-function device 10 sends a response. Then, as shown in FIG. 3, the PC 70 displays a web page 120 on the display unit 82. The web page 120 illustrated in FIG. 3 is a web page that is displayed when the character string 106 of "Configure TCP/IP" is clicked. If one of the other character strings 108 to 112 is clicked, a web page corresponding to the clicked one of the character strings 108 to 112 will be displayed.

The menu section 102 and the footer section 104 of the web page 120 are the same as those of the web page 100. Only the main section 103 of the web page 120 differs from that of the web page 100. The main section 103 of the web page 120 includes a character string 122, a setting data 124, a cancel key 136, and a submit key 138. The character string 122 is the character string of "Configure TCP/IP" corresponding to the character string 106 that was clicked on the web page 100. The setting data 124 is data concerning the various types of settings that are currently set in the multi-function device 10. The setting data 124 includes data 126 showing that TCP/IP is available, data 128 of an IP address, data 130 of a subnet mask, data 132 of a gateway, and data 134 showing that the boot method is "AUTO".

(Commands to be Communicated Between PC and Multi-Function Device)

Figure 4:
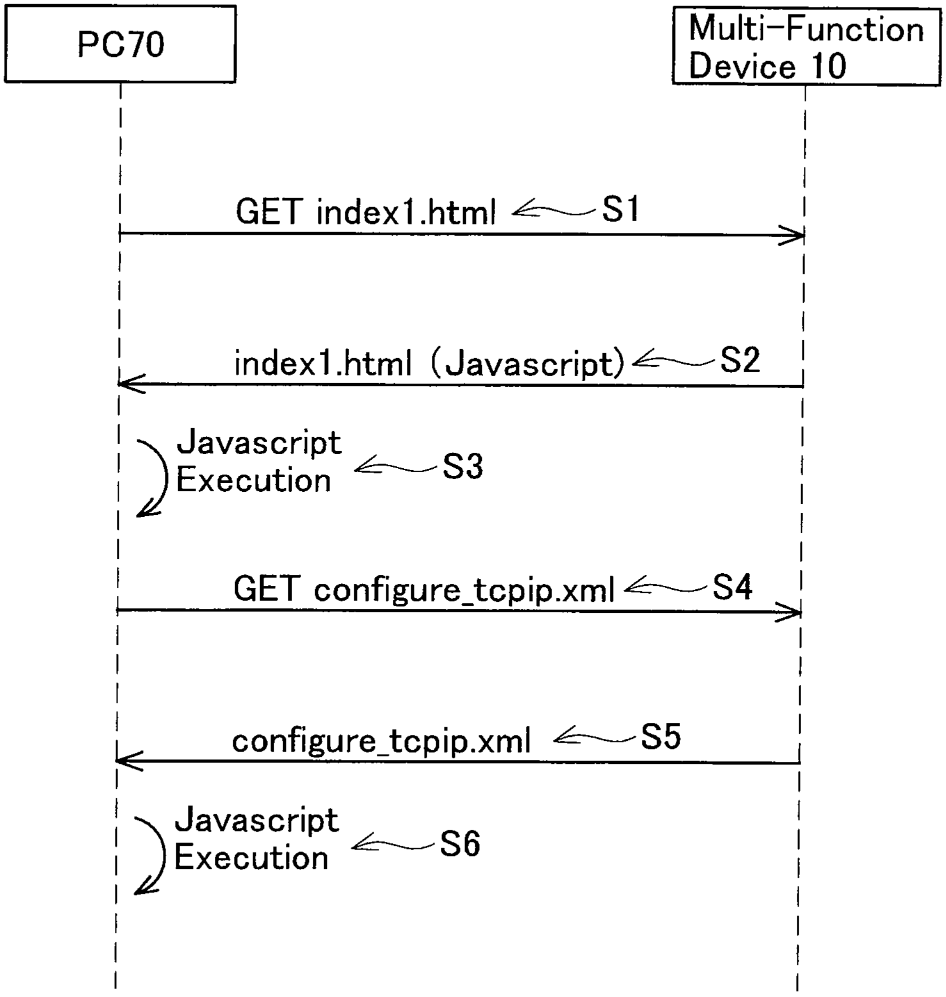
FIG. 4 shows commands to be transmitted between the PC and the multi-function device.

Commands to be communicated for displaying the web pages 100, 120 shown in FIG. 2 and FIG. 3 are now explained. FIG. 4 shows an example of the commands that are communicated between the PC 70 and the multi-function device 10. The respective commands depicted in FIG. 4 are sent as a result of the CPU 72 of the PC 70 executing processing according to the basic program 76, and the CPU 12 of the multi-function device 10 executing processing according to the server function program 18.

As described above, the user can input the website URL of the multi-function device 10 into the PC 70 by operating the operation unit 84 of the PC 70. In the first embodiment, there are two types of URL (a first URL and a second URL) as the website URL of the multi-function device 10. The user can input one URL among the two types of URLs into the PC 70 by operating the operation unit 84 of the PC 70. Consequently, the PC 70 sends a GET request corresponding to the URL that was input by the user (S1). Specifically, if the URL input by the user is the first URL, the PC 70 requests an index file having a file name of "index1.html". If the URL input by the user is the second URL, the PC 70 requests an index file having a file name of "index2.html".

When the multi-function device 10 receives the GET request, the multi-function device 10 sends a response including the index file 20 (or 22) corresponding to the previously received GET request (S2). In the example of S1 shown in FIG. 4, the index file having the file name of "index1.html" is being requested. Thus, the multi-function device 10 sends, at S2, a response including the first index file 20 having the file name of "index1.html". If the index file having the file name of "index2.html" is requested, the multi-function device 10 sends, at S2, a response including the second index file 22 having the file name of "index2.html".

FIG. 5 and FIG. 6 together show an example of the contents of the first index file 20. FIG. 6 shows the subsequent data of FIG. 5. The first index file 20 is described in an HTML format. As shown in FIG. 5, the first index file 20 includes a command 200 described according to JavaScript (registered trademark). JavaScript (registered trademark) shows the principle of the processing to be executed. Although the expression of the command 200 is simplified in FIG. 5 and FIG. 6, it may also include error processing or a script to be compatible with the respective browsers. The command 200 includes a load XML command 202, and a display XML command 210. The load XML command 202 includes a command 204 for sending an XML Http request, and a command 206 for executing the display XML command 210. The display XML command 210 includes a command 212 for converting data described in the XML format into data in the HTML format, and a command 214 for displaying the data in the HTML format that was created according to the command 212. The command 212 includes data 213 for determining the design (position, color, font, etc.) to be displayed.

As shown in FIG. 6, the first index file 20 also includes various types of descriptions that are not described according to JavaScript (registered trademark). For example, the first index file 20 includes a command 218 for executing the load XML command 202 (refer to FIG. 5) regarding the file name of "top.xml".

The first index file 20 includes a command 222 that is specified with a menu tag 220. The command 222 is a command for designating the display content of the menu section 102 (refer to FIG. 2). The command 222 includes data 224 including the character string of "Configure TCP/IP". The description of reference numeral 224 can also be described as a command for displaying the character string of "Configure TCP/IP". Although not shown in FIG. 6, the command 222 includes data including other character strings (FAX Settings, etc.) to be displayed in the menu section 102.

The first index file 20 includes a command 232 that is specified with a main tag 230. The command 232 is a command for designating the display content of the main section 103 (refer to FIG. 2). Moreover, the first index file 20 includes a command 242 to be specified with a footer tag 240. The command 242 is a command for designating the display content of the footer section 104 (refer to FIG. 2). Although not shown in FIG. 6, the command 242 includes a command for displaying the copyright indication 116 (refer to FIG. 2).

The PC 70 can display the web page 100 shown in FIG. 2 according to the first index file 20. The PC 70 can display the menu section 102 and the footer section 104 based on the commands 222 and 242 shown in FIG. 6. The main section 103 is displayed as follows. The PC 70 executes the load XML command 202 (refer to FIG. 5) regarding the file name of "top.xml" according to the command 218 shown in FIG. 6. Specifically, the PC 70 executes JavaScript (registered trademark). Foremost, the PC 70 sends a GET request of the file "top.xml" (refer to command 204 of FIG. 5). The files 24 stored in the ROM 14 of the multi-function device 10 include the file having the file name of "top.xml". The file "top.xml" is a file described in the XML format, and includes the character string of "Welcome". When the multi-function device 10 receives the GET request, the multi-function device 10 sends a response including the file "top.xml".

When the file "top.xml" is received, the PC 70 executes the display XML command 210 according to the command 206 shown in FIG. 5. Specifically, the PC 70 converts the file "top.xml" described in the XML format into data in the HTML format in which the design (position, font, color, etc.) has been determined according to the data 213 included in the command 212. Subsequently, the PC 70 displays the HTML format data according to the command 214. More specifically, the command 214 is a command for describing (writing) the HTML format data in the command 232 for determining the display content of the main section 103 in FIG. 6. The PC 70 writes the HTML format data into the command 232. Consequently, the PC 70 displays the character string 114 of "Welcome" on the main section 103 according to the HTML format data that was written into the command 232. The web page 100 shown in FIG. 2 is thereby displayed.

As described above, the user can click any one of the character strings 106 to 112 of the web page 100. For example, if the character string 106 is clicked, the PC 70 executes the processing according to the command 224 shown in FIG. 6. The PC 70 executes the load XML command 202 (refer to FIG. 5) regarding the file having a file name of "configure_tcpip.xml". Specifically, the PC 70 executes JavaScript (registered trademark) (S3 of FIG. 4). Foremost, the PC 70 sends a GET request of the file "configure_tcpip.xml" according to the command 204 of FIG. 5 (S4 of FIG. 4).

The files 24 stored in the ROM 14 of the multi-function device 10 include the file having the file name of "configure_tcpip.xml". The file "configure_tcpip.xml" is a file described in the XML format, and includes data relating to the various settings concerning the TCP/IP (refer to reference numeral 124 of FIG. 3). The setting storage area 32 of the NVRAM 30 of the multi-function device 10 stores the current settings concerning the TCP/IP. The multi-function device 10 update the settings concerning the TCP/IP included in the file "configure_tcpip.xml" with the current settings concerning the TCP/IP stored in the setting storage area 32. In other words, the multi-function device 10 creates, by writing the current settings concerning the TCP/IP into the file "configure_tcpip.xml", the file in which the current settings are written. Hereinafter the file "configure_tcpip.xml" in which the current settings are written is referred to as the "XML file").

FIG. 7 and FIG. 8 show an example of the contents of an XML file 250. FIG. 8 shows the subsequent data of FIG. 7. The XML file 250 includes a character string 252 showing that the XML file 250 is described in the XML format. The XML file 250 includes a character string 254 of the title. The XML file 250 includes various types of setting data 260, 270, 280, 290, 300. The setting data 260 includes a character string 262 of the title, a character string 264 showing the input type, and character strings 266, 268 concerning the current settings. Similarly, the other setting data 270, 280, 290, 300 include character strings 272, 282, 292, 302 of the title, character strings 274, 284, 294, 304 showing the input type, and character strings 276, 286, 296, 306 concerning the current settings.

The multi-function device 10 sends a response including the XML file 250 (S5 of FIG. 4). When the XML file 250 is received, the PC 70 executes the display XML command 210 according to the command 206 shown in FIG. 5. Specifically, the PC 70 executes JavaScript (registered trademark) (S6 of FIG. 4). More specifically, the PC 70 converts the XML file 250 described in the XML format into HTML format data in which the design corresponding to the command 212 has been determined. Subsequently, the PC 70 writes the HTML format data into the command 232 of FIG. 6 according to the command 214. Consequently, the PC 70 updates the display content of the main screen 103 according to the HTML format data written into the command 232. The web page 120 shown in FIG. 3 is thereby displayed. As described above, the command 214 is designating the main section 103 ("main"). Thus, the PC 70 updates only the main section 103 without changing the contents of the menu section 102 and the footer section 104.

(HTML Data Creation Processing by PC)

Figure 9:
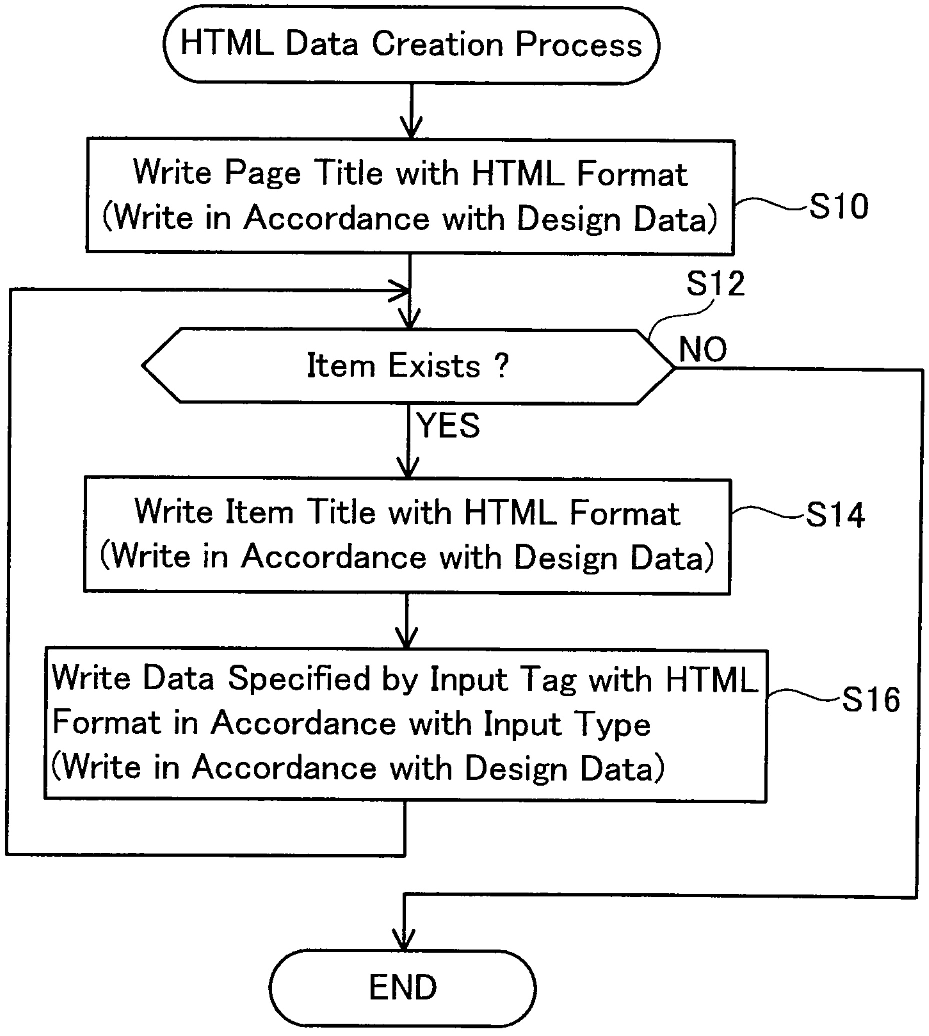
FIG. 9 shows a flowchart of a HTML data creation processing of the multi-function device.

The processing of the PC 70 creating the HTML format data from the XML file 250 according to the command 212 (hereinafter referred to as the "HTML data creation processing") is now explained. In other words, to explain the contents of the HTML data creation processing is equivalent to explaining the contents of the command 212. FIG. 9 is a simplified flowchart of the HTML data creation processing. The PC 70 creates HTML data in the work memory 80.

The PC 70 specifies the page title included in the XML file 250. Specifically, the PC 70 specifies "Configure TCP/IP" included in the character string 254 of FIG. 7. The PC 70 writes the page title of "Configure TCP/IP" in the HTML format (S10). At S10, the PC 70 writes the page title according to the data 213 (hereinafter referred to as the "design data") for determining the design (position, color, font, etc.) that is described in the command 212. Subsequently, the PC 70 determines whether data specified with an item tag exists in the XML file 250 (S12). In the example shown in FIG. 7 and FIG. 8, the setting data 260, 270, 280, 290, 300 are sets of data specified with the item tag. If the determination is "YES" at S12, the PC 70 executes S14 and S16.

Foremost, the PC 70 executes S14 and S16 regarding the top setting data 260 included in the XML file 250. The PC 70 specifies the item title included in the setting data 260. Specifically, the PC 70 specifies "TCP/IP" included in the character string 262 of FIG. 7. The PC 70 writes the item title of "TCP/IP" in the HTML format (S14). At S14, the PC 70 writes the item title according to the design data 213 described in the command 212. Subsequently, the PC 70 specifies the input type included in the setting data 260. Specifically, the PC 70 specifies "radio" included the character string 264 of FIG. 7. The PC 70 writes the data 266, 268 specified with the input tag according to the input type "radio" in the HTML format (S16). Specifically, if the input type is "radio", HTML data in which the checkbox shown with reference numeral 126 in FIG. 3 will be displayed is created. At S16, the PC 70 writes data corresponding to the input type according to the design data 213 described in the command 212.

The PC 70 executes S14 and S16 regarding each setting data 270, 280, 290, 300. The input type of the character strings 274, 284 of FIG. 7 and the character string 294 of FIG. 8 is "text". If the input type is "text", HTML data in which the text shown with reference numerals 128, 130, 132 in FIG. 3 will be displayed is created. Moreover, the input type of the character string 304 of FIG. 8 is "select". If the input type is "select", HTML data in which the selection icon shown with reference numeral 134 in FIG. 3 will be displayed is created. When S14 and S16 are executed regarding all of the setting data 260, 270, 280, 290, 300, "NO" is determined at S12. The HTML data creation processing is thereby ended.

(Explanation of Index File)

The differences between the first index file 20 and the second index file 22 are now explained. Although the second index file 22 is configured approximately the same as the first index file 20, the contents of the command 212 of FIG. 5 are different from the first index file 20. As described above, the command 212 includes the design data 213 for determining the design. The second index file 22 includes design data that is different from the design data of the first index file 20. For example, the first index file 20 includes the design data 213 for commanding to display all characters in red. In the foregoing case, with the web page that is created according to the design data 213 of the first index file 20, all characters of the main section 103 will be displayed in red. Moreover, for example, the second index file 22 includes the design data for commanding to display all characters in blue. In the foregoing case, with the web page that is created according to the design data of the second index file 22, all characters of the main section 103 will be displayed in blue.

The multi-function system 2 of the first embodiment has been explained in detail. In the first embodiment, the PC 70 can create HTML format data from an XML format file ("top.xml", "configure_tcpip.xml", etc.) according to the command 200 of the index file 20 (or 22) described in JavaScript (registered trademark). The command 212 includes the design data 213 for determining the design to be displayed. Thus, it is possible to configure the PC 70 to create HTML format data in which the design to be displayed has been determined. In this case, the multi-function device 10 is not required to create the data (HTML format data in which the design has been determined) to be displayed on the main section 103 of FIG. 2 and FIG. 3. Thus, the load required for the multi-function device 10 to execute the web server function can be made smaller.

Moreover, in the first embodiment, the command 200 described in JavaScript (registered trademark) is a command for updating only the main section 103. Accordingly, when updating the web page 100 of FIG. 2 to the web page 120 of FIG. 3, the PC 70 updates only the main section 103 without changing the display contents of the menu section 102 and the footer section 104. The multi-function device 10 is not required to send the data (data of the menu section 102 and the footer section 104) for updating the overall web page, and only needs to send the data for updating the main section 103. Thus, the load of the multi-function device 10 can be made smaller.

Moreover, in the first embodiment, the multi-function device 10 stores the plurality of index files 20, 22. The index files 20, 22 have mutually different design data 213. The user can select the URL to be input into the PC 70 in order to acquire the index files 20, 22. Specifically, the user can send the request for the index files 20, 22 corresponding to the web page of the intended design from the PC 70 to the multi-function device 10. According to the first embodiment, the user can display the web page of the intended design on the PC 70.

Modified examples of the first embodiment are shown below. [0071] (1) The commands (for example, commands 202, 210, etc.) that are described in the first index file 20 may be included in an external file. The first index file 20 may include, for example, in substitute for a specifically described command (such as the commands 202, 210), a command for sending a request for the external file which includes the specifically described command. [0072] (2) CSV, tab separated variable text, independent language (independent format) determined by a vendor of the multi-function device 10, HTML, XHTML, or the like may also be adopted in substitute for XML. XHTML or the like may also be adopted in substitute for HTML.

Second Embodiment

The multi-function system of the second embodiment will be explained below. The multi-function system 2 of the second embodiment has approximately the same configuration as the configuration of the first embodiment shown in FIG. 1. More specifically, the multi-function device 10 of the second embodiment differs from the multi-function device 10 of the first embodiment only in that the ROM 14 is storing only one index file (only the index file 1020), and is otherwise equivalent to the multi-function device 10 of the first embodiment. The contents of the index file 1020 in the second embodiment are different from the contents of the index file 1020 in the first embodiment. The configuration of the PC 70 in the second embodiment is equivalent to the configuration of the PC 70 in the first embodiment.

(Example of Web Page)

Figure 10:
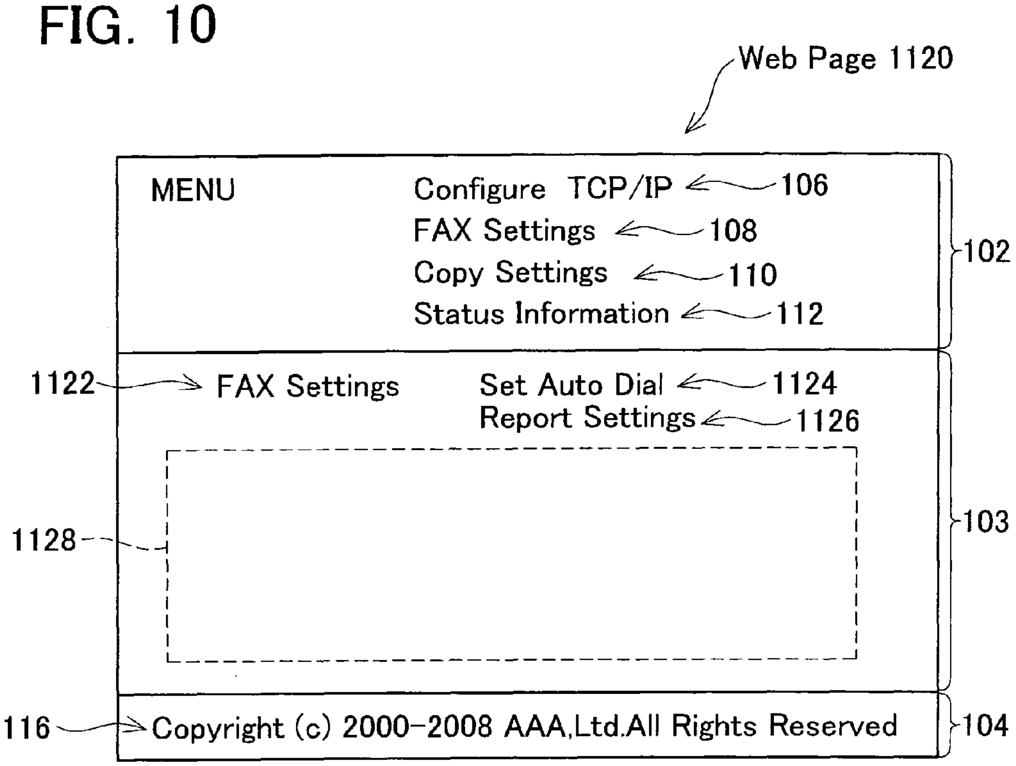
FIG. 10 to FIG. 13 show examples of web pages.

An example of a web page to be displayed on the web browser of the PC 70 will be explained. How a web page is created will be explained in detail after the contents of the web page are explained. The user can input the website URL of the multi-function device 10 into the PC 70 by operating the operation unit 84 of the PC 70. Consequently, the PC 70 sends a GET request to the multi-function device 10, and the multi-function device 10 sends a response. Then, as shown in FIG. 10, the PC 70 displays a web page 1120 on the display unit 82. The web page 1120 includes a menu section 102, a main section 103, and a footer section 104. The menu section 102 includes a plurality of character strings 106 to 112. The main section 103 includes a character string 1122 of "FAX Settings", and a plurality of character strings 1124, 1126. On the web page 1120, nothing is displayed in a portion 1128 in the main section 103. The footer section 104 includes a copyright indication 116.

Figure 11:
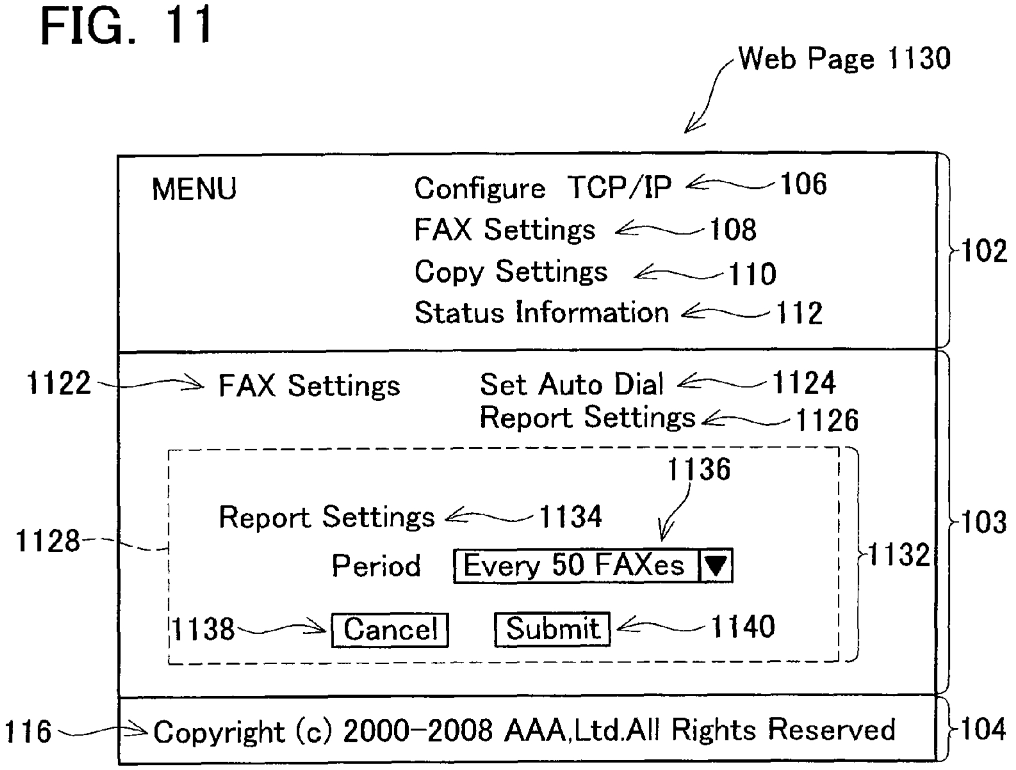

In a state where the web page 1120 is displayed on the display unit 82, the user can click any one of the character strings 1124, 1126 by operating the operation unit 84. Consequently, the PC 70 sends a GET request to the multi-function device 10, and the multi-function device 10 sends a response. Then, as shown in FIG. 11, the PC 70 displays a web page 1130 on the display unit 82. The web page 1130 illustrated in FIG. 11 is a web page that is displayed when the character string 1126 of "Report Settings" is clicked.

The web page 1130 is the same as the web page 1120 regarding the portions other than the portion 1128 in the main section 103. The web page 1130 differs from the web page 1120 only regarding the portion 1128 in the main section 103. The portion 1128 displays setting input interface display data 1132. The setting input interface display data 1132 includes a character string 1134, setting data 1136, a cancel key 1138, and a submit key 1140. The character string 1134 is the character string of "Report Settings" corresponding to the character string 1126 that was clicked on the web page 1120 of FIG. 10. The setting data 1136 is data concerning the setting which is currently set in the multi-function device 10. The setting data 1136 shows that a report of the FAX communication record is output for every fifty FAX communications. If the character string 1124 is clicked on the web page 1120 of FIG. 10, the setting input interface display data corresponding to the character string 1124 is displayed on the portion 1128 of the main section 103. In the foregoing case also, only the portion 1128 is updated, and the display content of the other portions is not changed.

Figure 12:
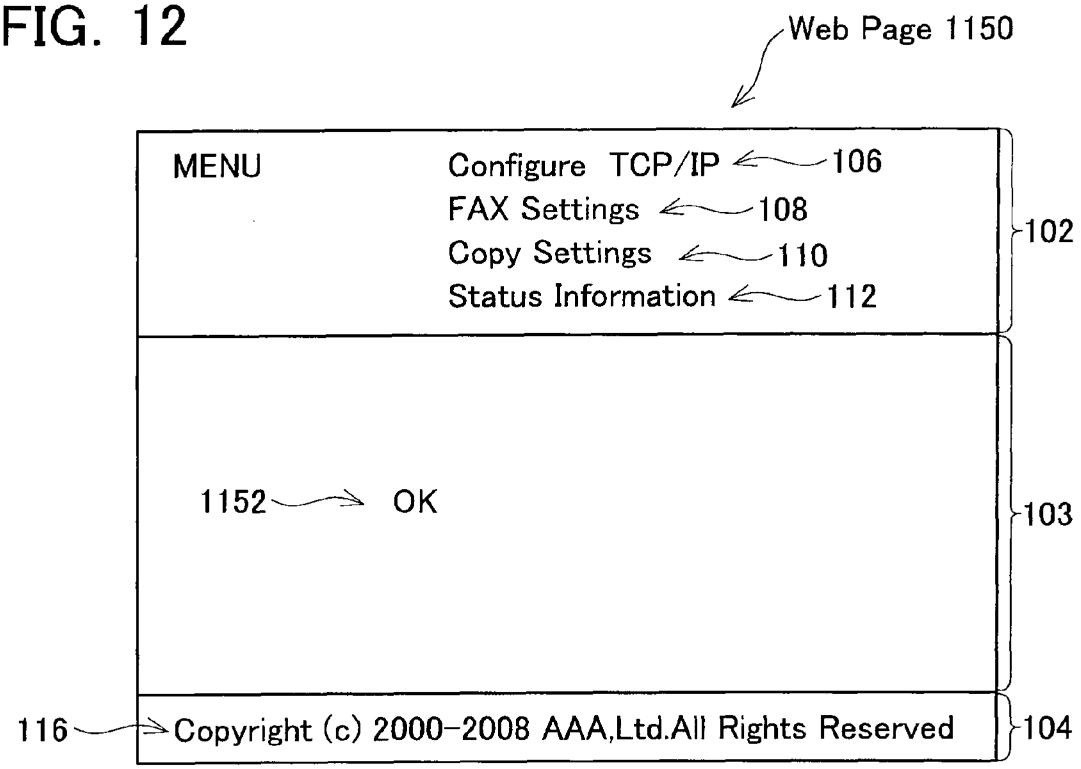

In a state where the web page 1130 is displayed, the user can change the setting data 1136 and click the submit key 1140 by operating the operation unit 84. Consequently, the PC 70 sends a POST request to the multi-function device 10, and the multi-function device 10 sends a response. Then, as shown in FIG. 12, the PC 70 displays a web page 1150 on the display unit 82.

The menu section 102 and the footer section 104 of the web page 1150 are the same as those of the web page 1130. Only the main section 103 of the web page 1150 differs from that of the web page 1130. The main section 103 includes a character string 1152 of "OK". This means that an affirmative response was received from the multi-function device 10 in response to the POST request. Alternately, a negative response could also be received from the multi-function device 10 in response to the POST request. In this case, a character string of "error" (not shown) is displayed on the main section 103 (while the other portions 102, 104 are not changed).

Figure 13:
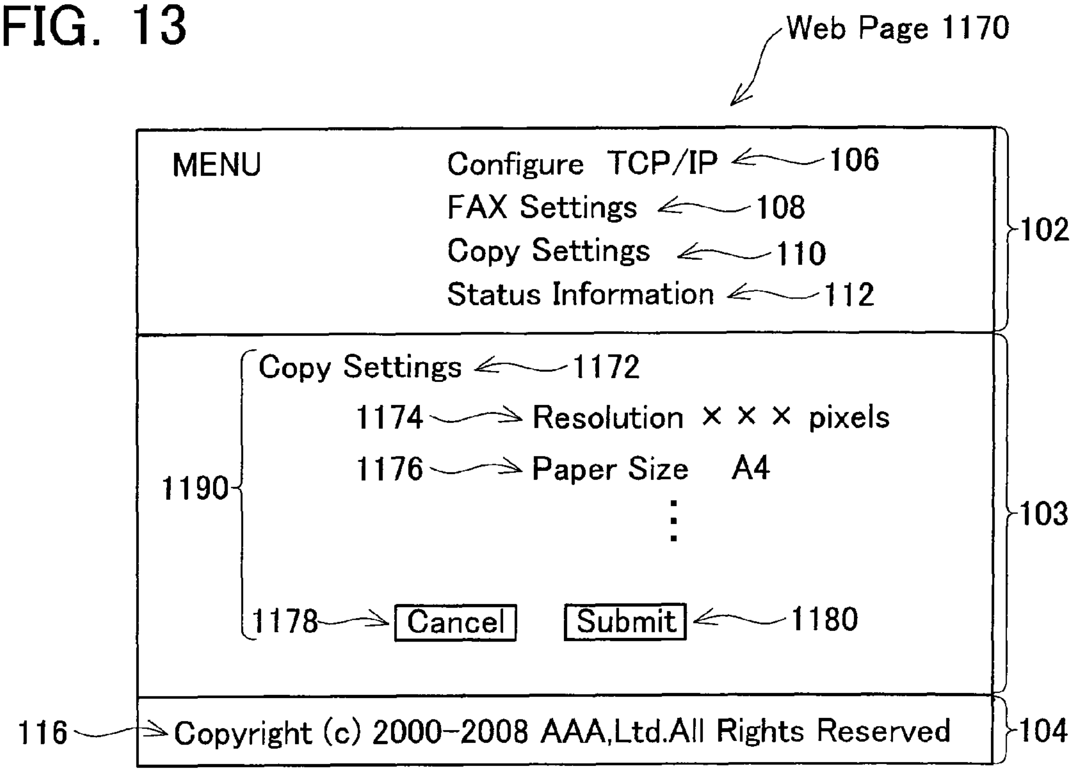

In a state where the web page 1120 of FIG. 10 (or the web page 1130 or 1150 of FIG. 11 or FIG. 12) is displayed on the display unit 82, the user can click any one of the character strings 106 to 112 of the menu section 102 by operating the operation unit 84. Consequently, the PC 70 sends the GET request to the multi-function device 10, and the multi-function device 10 sends the response. Then, as shown in FIG. 13, the PC 70 displays a web page 1170 on the display unit 82. The web page 1170 illustrated in FIG. 13 is a web page that is displayed when the character string 110 of "Copy Settings" is clicked. If the other character strings 106, 108, 112 are clicked, the web page corresponding to the clicked character strings 106, 108, 112 is displayed. If the character string 108 is clicked, the web page 1120 shown in FIG. 10 is displayed.

The menu section 102 and the footer section 104 of the web page 1170 are the same as those of the web page 1120. Only the main section 103 of the web page 1170 differs from that of the web page 1120. The main section 103 of the web page 1170 includes setting input interface display data 1190. The setting input interface display data 1190 includes a character string 1172, setting data 1174, 1176, a cancel key 1178, and a submit key 1180. The character string 1172 is the character string of "Copy Settings" corresponding to the character string 110 that was clicked on the web page 1120 of FIG. 10. The setting data 1174, 1176 are data concerning the settings that are currently set in the multi-function device 10. The setting data 1174 shows that the resolution is "XXX". The setting data 1176 shows that the paper size is "A4".

In a state where the web page 1170 is displayed, the user can change the setting data 1174 and/or 1176 and click the submit key 1180 by operating the operation unit 84. Consequently, the PC 70 sends the POST request to the multi-function device 10, and the multi-function device 10 sends the response. Then, the PC 70 displays a web page (for example, the web page 1150 of FIG. 12) in which the character string (OK or error) corresponding to the response is disposed in the main section 103.

(Commands to be Communicated Between PC and Multi-Function Device)

The commands to be communicated for displaying the web pages 1120, 1130, 1150, 1170 shown in FIG. 10 to FIG. 13 on the PC 70 are now explained. The respective commands are sent as a result of the CPU 72 of the PC 70 executing processing according to the basic program 76, and the CPU 12 of the multi-function device 10 executing processing according to the server function program 18.

As described above, the user can input the website URL of the multi-function device 10 into the PC 70 by operating the operation unit 84 of the PC 70. The PC 70 sends a GET request corresponding to the URL that was input by the user. When the multi-function device 10 receives the GET request, the multi-function device 10 sends a response including the index file 1020.

(Contents of Index File)

FIG. 14 shows an example of the contents of the index file 1020. The index file 1020 includes a file name of "index.html" and is written in the HTML format. The index file 1020 includes commands 1202, 1204, 1206 for acquiring three external files. The fact that the commands 1202, 1204, 1206 are included in the index file 1020 is equivalent to that the contents of three external files are described in the index file 1020. The extension of the three external files is "js". This extension shows that the three external files are described in JavaScript (registered trademark). The contents of the three external files will be explained in detail later.

The index file 1020 includes a command 1212 that is specified with a menu tag 1210. The command 1212 is a command for designating the display content of the menu section 102 (refer to FIG. 10). Specifically, the command 1212 is a command for displaying the character string 106 to 112 of FIG. 10. The command 1212 includes a command 1214 for displaying a character string 108 of "FAX Settings", and a command 1216 for displaying a character string 110 of "Copy Settings". Although not shown in FIG. 14, the command 1212 includes commands for displaying other character strings 106, 112 ("Configure TCP/IP", "Status Information", "MENU", etc.).

The index file 1020 includes a command 1222 that is specified with a menu tag 1220. The command 1222 is a command for designating the display content of the main section 103 (refer to FIG. 10). Specifically, the command 1222 is a command for displaying the character strings 1122, 1124, 1126 of FIG. 10. The command 1222 includes a command 1224 for displaying a character string 1124 of "Set Auto Dial", and a command 1226 for displaying a character string 1126 of "Report Settings". Although not shown in FIG. 14, the command 1222 also includes commands for displaying another character string 1122 ("FAX Settings"). Moreover, the command 1222 includes a command 1232 that is specified with a setting tag 1230. The command 1232 is a command for designating the display contents of the portion 1128 in the main section 103 (refer to FIG. 10). With the web page 1120 of FIG. 10 in the second embodiment, nothing is displayed in the portion 1128. Accordingly, the command 1232 is a command for displaying nothing.

The index file 1020 includes a command 1242 that is specified with a footer tag 1240. The command 1242 is a command for designating the display contents of the footer section 104 (refer to FIG. 10). Although not shown in FIG. 14, the command 1242 includes a command for displaying a copyright indication 116 (refer to FIG. 10).

The PC 70 can display the web page 1120 shown in FIG. 10 according to the index file 1020. Specifically, the PC 70 can display the menu section 102 in which the character strings 106 to 112 are disposed according to the commands 1214, 1216, and the like. Moreover, the PC 70 can display the main section 103 in which the character strings 1122, 1124, 1126 are disposed according to the commands 1224, 1226 and the like. In addition, the PC 70 can display the footer section 104 in which the copyright indication 116 is displayed according to the command 1242.

As described above, in a state where the web page 1120 of FIG. 10 (or the web page 1130, 1150 or 1170 of FIG. 11 to FIG. 13) is displayed on the display unit 82, the user can click any one of the character strings 106 to 112 of the menu section 102. In this case, the PC 70 executes the function that is designated with the character string of "loadMain" according to the commands 1214, 1216 of the index file 1020 of FIG. 14. This function is described in the external file (hereinafter referred to as the "load file") of the file name of "load.js" which is acquired according to the command 1202.

(Contents of Load File)

FIG. 15 shows an example of the contents of the load file 1250. The load file 1250 is described according to JavaScript (registered trademark). JavaScript (registered trademark) shows the principle of the processing to be executed. Although the respective commands are illustrated simply in FIG. 15, they may also include error processing or a script to be compatible with the respective browsers. For example, the load file 1250 may include a script or the like of the command 1332 shown in FIG. 17. The load file 1250 includes a load main command 1260, and a display main command 1270. The load main command 1260 is specified with a character string of "loadMain", and is executed according to the commands 1214, 1216 of FIG. 14. The load main command 1260 includes a command 1262 for sending an XML Http request, and a command 1264 for executing the display main command 1270. The display main command 1270 includes a command 1272 for displaying a response with respect to the XML Http request. The command 1272 is a command for describing (writing) said response in the command 1222 (command for designating the display content of the main section 103) of FIG. 14.

For example, if the character string 110 (Copy Settings) of FIG. 10 is clicked, the PC 70 executes the load main command 1260 of FIG. 15 according to the command 1216 of FIG. 14. The PC 70 sends a request for a file having a file name of "copy_settings.html" that is described in the command 1216 according to the command 1262 included in the load main command 1260. Specifically, the PC 70 sends a request including the character string of "copy_settings.html". Then, the multi-function device 10 sends a response including the file "copy_settings.html". The PC 70 executes the display main command 1270 according to the command 1264 of FIG. 15. Specifically, the PC 70 writes the data included in the file "copy_settings.html" (the data of the response) into the command 1222 of FIG. 14 according to the command 1272 included in the display main command 1270. Consequently, the PC 70 displays the setting input interface display data 1190 (refer to FIG. 13) on the main section 103 according to the data that is written into the command 1222. The PC 70 updates only the main section 103 without changing the contents of the menu section 102 and the footer section 104. The web page 1170 shown in FIG. 13 is thereby displayed.

As described above, in a state where the web page 1120 of FIG. 10 (or web page 1130 of FIG. 11) is displayed on the display unit 82, the user can click any one of the character strings 1124, 1126. In the foregoing case, the PC 70 executes the function that is designated with the character string of "loadSettings" according to the commands 1224, 1226 of the index file 1020 of FIG. 14. This function is described in the load file 1250 of FIG. 15.

The load file 1250 includes a load setting command 1280, and a display setting command 1290. The load setting command 1280 is specified with a character string of "loadSettings", and is executed according to the commands 1224, 1226 of FIG. 14. The load setting command 1280 includes a command 1282 for sending an XML Http request, and a command 1284 for executing the display setting command 1290. The display setting command 1290 includes a command 1292 for displaying the response with respect to the XML Http request. The command 1292 is a command for describing (writing) said response in the command 1232 (command for designating the display content of the portion 1128 of the main section 103) of FIG. 14.

For example, if the character string 1126 (Report Settings) of FIG. 10 is clicked, the PC 70 executes the load setting command 1280 of FIG. 15 according to the command 1226 of FIG. 14. The PC 70 sends a request for a file having a file name of "report_settings.html" described in the command 1226 according to the command 1282 included in the load setting command 1280. Specifically, the PC 70 sends a request including a character string of "report_settings.html". Then, the multi-function device 10 sends a response including the file "report_settings.html". The PC 70 executes the display setting command 1290 according to the command 1284. Specifically, the PC 70 writes the data included in the file "report_settings.html" (the data of the response) into the command 1232 of FIG. 14 according to the command 1292 included in the display setting command 1290. Consequently, the PC 70 displays the setting input interface display data 1132 (refer to FIG. 11) in the portion 1128 of the main section 103 according to the data that is written into the command 1232. The PC 70 updates only the portion 1128 without changing the display contents other than the portion 1128. The web page 1130 shown in FIG. 11 is thereby displayed.

As described above, in a state where the web page 1130 of FIG. 11 is displayed on the display unit 82, the user can change the setting data 1136 and click the submit key 1140. Moreover, in a state where the web page 1170 of FIG. 13 is displayed on the display unit 82, the user can change the setting data 1174 and/or 1176 and click the submit key 1180. When the submit keys 1140, 1180 are clicked, the PC 70 executes processing according to an external file (hereinafter referred to as the "post file") having a file name of "post.js" that is acquired according to the command 1206 of the index file 1020 of FIG. 14. In the index file 1020 of FIG. 14, a command for executing the processing according to the post file when the submit keys 1140, 1180 are clicked is not shown. In reality, the index file 1020 includes a command that is specified with a tag of the character string of "form" (command for executing the processing according to the post file). This command will be explained in detail later.

(Contents of Post File)

FIG. 16 shows an example of the contents of the post file 1300. The post file 1300 is described according to JavaScript (registered trademark). The post file 1300 includes a FAX setting post command 1310, and a copy setting post command 1320. In FIG. 16, post commands corresponding to other settings (for example, the setting of TCP/IP) are not shown.

The FAX setting post command 1310 is executed when the submit key in the setting input interface display data concerning FAX is clicked. For example, the FAX setting post command 1310 is executed when the submit key 1140 in the setting input interface display data 1132 of FIG. 11 is clicked. The FAX setting post command 1310 includes a command 1312 and a command 1314. The command 1312 is a command for creating data including the setting data 1136 that is currently being displayed in the setting input interface display data 1132 (i.e. setting data that has been changed by the user). Hereinafter, the data including the setting data that has been changed by the user is referred to as the "setting change data". The command 1314 is a command for executing the function that is designated with the character string of "post_request".

The copy setting post command 1320 is executed when a submit key in the setting input interface display data concerning copy is clicked. For example, the copy setting post command 1320 includes a command 1322 and a command 1324. The command 1322 is a command for creating the setting change data including the setting data 1174, 1176 that is currently being displayed in the setting input interface display data 1190 in FIG. 13 (i.e. setting data that has been changed by the user). The command 1324 is a command for executing the function that is designated with the character string of "post_request". The function that is designated with the command 1314 of the FAX setting post command 1310 or the command 1324 of the copy setting post command 1320 is described in an external file (hereinafter referred to as the "post request file") having a file name of "post_request.js" that is acquired according to the command 1204 of the index file 1020 of FIG. 14.

(Contents of Post Request File)

FIG. 17 and FIG. 18 show an example of the contents of the post request file 1330. FIG. 18 shows the subsequent contents of FIG. 17. The post request file 1330 is described according to JavaScript (registered trademark). As shown in FIG. 17, the post request file 1330 includes a command 1332 for sending a POST request, a command 1334 for executing the function (get response) when receiving a response, and a command 1336 for putting the setting change data in the POST request. Although it will be explained in detail later, the multi-function device 10 determines whether the setting change data included in the POST request complies with the multi-function device 10 and be applicable thereto, and changes the response according to the determination result. When the PC 70 receives this response, the PC 70 executes the command 1340 shown in FIG. 18 according to the command 1334.

The command 1340 includes a command 1350 that is to be executed when an affirmative response is received, and a command 1352 to be executed when a negative response is received. The command 1350 is a command for displaying the affirmative response (result). The "id" that is designated in the command 1350 is the "main" that is designated in the commands 1314, 1324 and the like of FIG. 16. Specifically, the command 1350 is a command for describing (writing) the affirmative response in the command 1222 (command for designating the display content of the main section 103) of FIG. 14. When executing the command 1350, the PC 70 writes the data for displaying the character string 1152 of "OK" into the command 1222 of FIG. 14. The web page 1150 shown in FIG. 12 is thereby displayed. The PC 70 updates only the main section 103 without changing the contents of the menu section 102 and the footer section 104. Moreover, the command 1352 is a command for displaying the negative response (error). The "id" that is designated in the command 1352 is also the "main" that is designated in the commands 1314, 1324 and the like of FIG. 16. Specifically, the command 1352 is a command for describing (writing) the negative response in the command 1222 (command for designating the display content of the main section 103) of FIG. 14. When executing the command 1352, the PC 70 writes the data for displaying the character string (not shown) of "error" into the command 1222 of FIG. 14. In this case also, the PC 70 updates only the main section 103 without changing the contents of the menu section 102 and the footer section 104.

(Processing Executed by Multi-Function Device)

Figure 19:
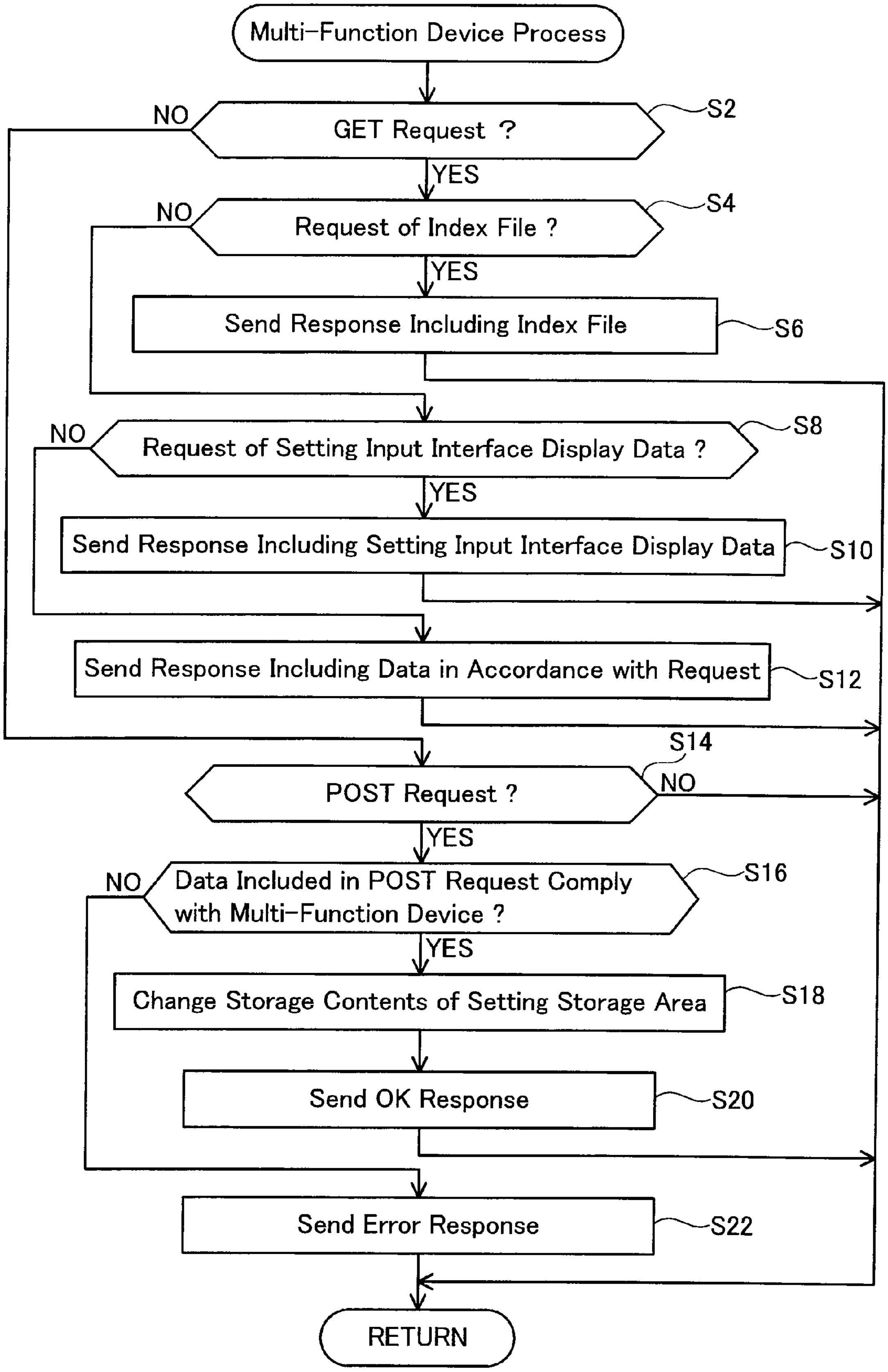
FIG. 19 shows a flowchart of a processing to be executed by the multi-function device.

The processing executed by the multi-function device 10 is now explained. FIG. 19 shows a flowchart of the processing to be executed by the multi-function device 10. The multi-function device 10 is monitoring the reception of the GET request (S2). As described above, when the website URL of the multi-function device 10 is input into the PC 70, the PC 70 sends the GET request to the multi-function device 10. Moreover, the PC 70 also sends the GET request when executing the commands 1262, 1282 of FIG. 15. When the multi-function device has received the GET request, the determination is "YES" at S2.

If the determination is "YES" at S2, the multi-function device 10 determines whether it is a request for the index file 1020 (S4). When the request sent from the PC 70 is received as a result of the website URL of the multi-function device 10 being input, the determination is "YES" at S4. In the foregoing case, the multi-function device 10 sends a response including the index file 1020 (S6).

Meanwhile, if the determination is "NO" at S4, the multi-function device 10 determines whether it is a request for the setting input interface display data (S8). When the request sent from the PC 70 is received according to the commands 1262, 1282 of FIG. 15, the determination is "YES" at S8. In the foregoing case, the multi-function device 10 executes the following processing based on the file name included in the request. The processing contents are now explained on the assumption that the file name of "copy_settings.html" (refer to command 1216 of FIG. 14) is included in the request. The files 24 that are stored in the ROM 14 of the multi-function device 10 include a file having the file name of "copy_settings.html". Specifically, the ROM 14 stores an association of the character string of "copy_settings.html" and the setting input interface display data concerning copy (refer to reference numeral 1190 of FIG. 13). The setting storage area 32 of the NVRAM 30 of the multi-function device 10 stores the current setting concerning copy. The multi-function device 10 writes the current setting concerning copy (in the example of FIG. 13, resolution "XXX" and paper size "A4") into the file "copy_settings.html". Subsequently, the multi-function device 10 sends the response including the file "copy_settings.html" (S10).

Moreover, for instance, if the file name of "report_settings.html" (refer to command 1226 of FIG. 14) is included in the request, the multi-function device 10 executes the following processing. The files 24 that are stored in the ROM 14 of the multi-function device 10 include a file having the file name of "report_settings.html". Specifically, the ROM 14 stores an association of the character string of "report_settings.html" and the setting input interface display data concerning FAX report (refer to reference numeral 1132 of FIG. 11). The setting storage area 32 of the NVRAM 30 of the multi-function device 10 stores the current setting concerning FAX report. The multi-function device 10 writes the current setting concerning FAX report (in the example of FIG. 11, "Every 50 FAXes") into the file "report_settings.html". Subsequently, the multi-function device 10 sends the response including the file "copy_settings.html" (S10).

If the determination is "NO" at S8, the multi-function device 10 sends a response including data according to the GET request (S12). For example, the files 24 of the ROM 14 include the load file 1250, the post file 1300, and the post request file 1330. When the request for the file 1250, 1300 or 1330 is received, the multi-function device 10 sends a response including the corresponding file 1250, 1300 or 1330 at S12.

The multi-function device 10 is monitoring the reception of the POST request (S14). If the PC 70 has sent the POST request according to the command 1332 (refer to FIG. 17) of the post request file 1330 and the multi-function device 10 has received the POST request, the determination is "YES" at S14. In the foregoing case, the multi-function device 10 determines whether the setting change data included in the POST request complies with the multi-function device 10 (S16). For example, if a resolution that exceeds the highest resolution that is executable by the main function 10 is input in the setting input interface display data 1190 of FIG. 13 and such inapplicable resolution is included in the POST request, the determination is "NO" at S16. There are various types of criteria for S16. For example, the determination is also "NO" at S16 if a paper size included in the POST request does not comply with the paper sizes which the multi-function device 10 can print. In addition, the determination is also "NO" at S16 if the setting concerning FAX, the setting concerning TCP/IP, and the like of the setting change data included in the POST request does not comply with the available settings of the multi-function device 10.

If the determination is "NO" at S16, the multi-function device 10 sends an error response (S22). Then, the PC 70 displays the character string of "error" on the main section 103 according to the command 1352 of FIG. 18. Meanwhile, if the determination is "YES" at S16, at S18, the multi-function device 10 updates the memory content of the setting storage area 32 with the setting change data included in the POST request received at S14. Consequently, the multi-function device 10 will use the setting data newly stored in the setting storage area 32 when executing the subsequent processing. After completing S18, the multi-function device 10 sends an OK response which is different from the error response sent at S22 (S20). Then, the PC 70 displays the character string of "OK" on the main section 103 according to the command 1350 of FIG. 18 (refer to FIG. 12).

The multi-function system 2 of the second embodiment has been explained in detail. According to the second embodiment, the PC 70 can update the display of only the main section 103 without changing the display of the menu section 102 and the footer section 104 according to the display main command 1270 (refer to FIG. 15) of the load file 1250. The multi-function device 10 is not required to send data corresponding to the menu section 102 and the footer section 104 when sending the response with respect to the request sent from the PC 70 according to the command 1262 (refer to FIG. 15) of the load file 1250. The multi-function device 10 is not required to send data for updating the entire web page, and only needs to send data that is required for the update of a part of the web page. Thus, the load of the multi-function device 10 can be made small with this respect.

The PC 70 can update the display of only the portion 1128 of the main section 103 according to the display setting command 1290 (refer to FIG. 15) of the load file 1250. The multi-function device 10 is not required to send extra data for updating the portions other than the portion 1128 upon sending the response to the request sent from the PC 70 according to the command 1282 (refer to FIG. 15) of the load file 1250. The multi-function device 10 is not required to send data for updating the entire web page, and only needs to send smaller sized data that is required for the update. Thus, the load of the multi-function device 10 can be made small.

Moreover, the PC 70 can update only the main section 103 to the data corresponding to the response with respect to the POST request and display the same according to the commands 1350, 1352 (refer to FIG. 18) of the post request file 1330. The multi-function device 10 is not required to send data for updating the portions other than the main section 103 upon sending the response to the POST request. The multi-function device 10 is not required to send data for updating the entire web page, and only needs to send data that is required for the update. Thus, the load of the multi-function device 10 can be made small.

Third Embodiment

Figure 20:
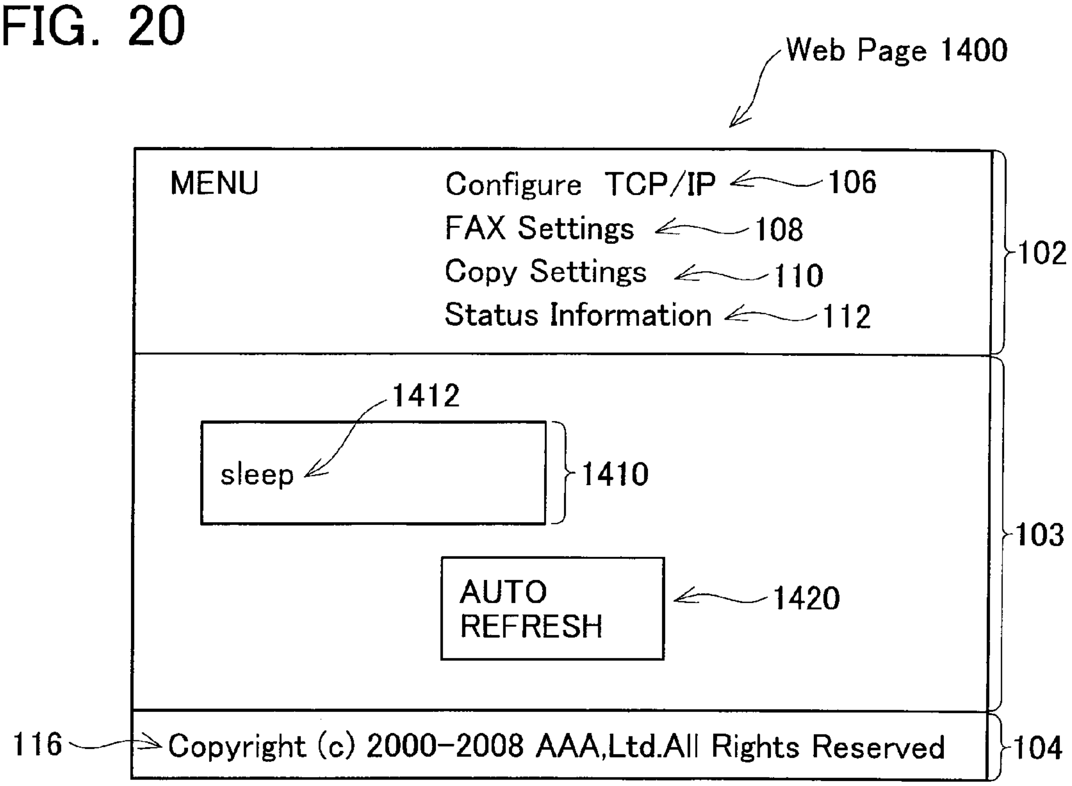
FIG. 20 and FIG. 21 show examples of web pages (third embodiment).

The third embodiment is now explained. Foremost, an example of a web page to be displayed on the web browser of the PC 70 is explained. FIG. 20 shows an example of a web page 1400 to be displayed on the PC 70. The menu section 102 and the footer section 104 of the web page 1400 are the same as those of the second embodiment. The contents of the main section 103 differ from the second embodiment. The main section 103 includes a portion 1410 for displaying the status of the multi-function device 10. In the example of FIG. 20, a character string 1412 of "sleep" is displayed in the portion 1410.

The main section 103 includes an icon 1420 for automatically updating the display content of the portion 1410. The user can click the icon 1420. When the icon 1420 is clicked, the PC 70 periodically sends a GET request of the status. The multi-function device 10 sends a response including the status according to the GET request. Then, the PC 70 can display the current status (e.g., character string 1432 of "printing" in FIG. 21) as shown on the web page 1430 of FIG. 21. The PC 70 updates and displays only the portion 1410 to the status included in the response without changing the contents of portions other than the portion 1410.

(Contents of Status File)

Figure 21:
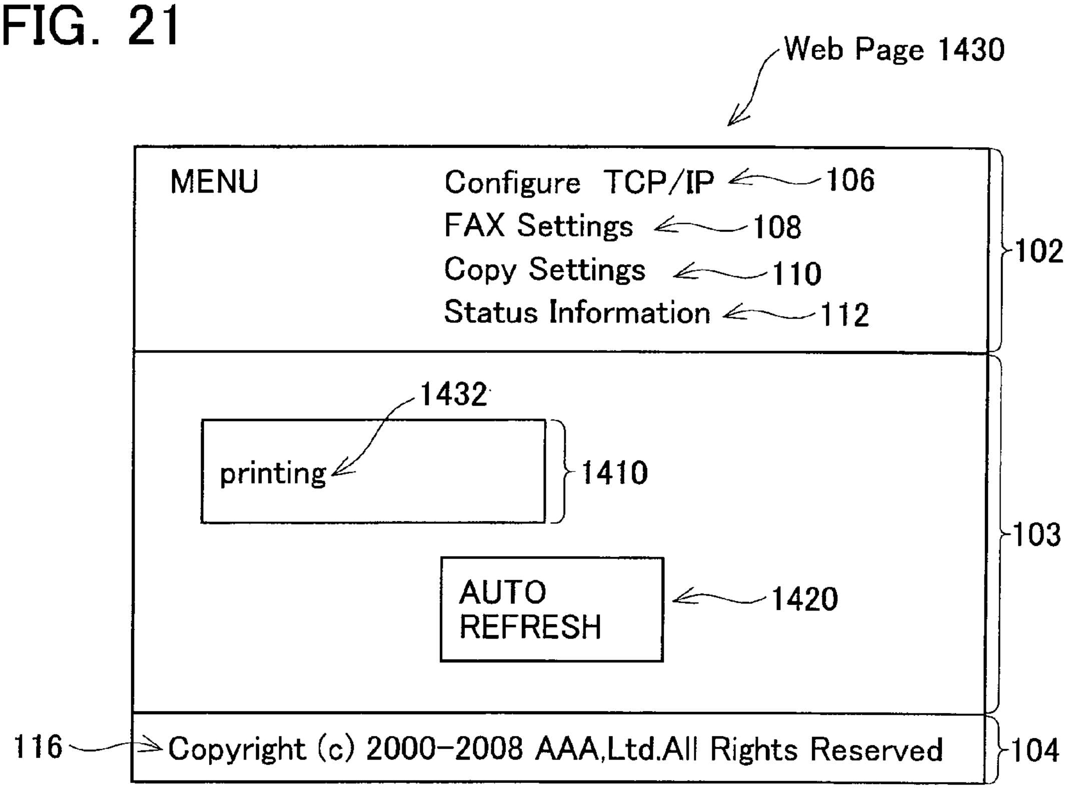

Contents of the file (hereinafter referred to as the "status file") that are required for the PC 70 to display the web pages 1400, 1430 of FIG. 20 and FIG. 21 are now explained. FIG. 22 shows an example of a status file 1500. The third embodiment uses the status file 1500 in substitute for the index file 1020.

The status file 1500 includes a file name of "status.html", and is described in the HTML format. The status file 1500 includes commands 1510, 1520, 1530 described according to JavaScript (registered trademark). The command 1510 is a command for designating the timing of executing the GET status command 1520 described later. In the ensuing explanation, the command 1520 is referred to as the "GET status command" and the command 1530 is referred to as the "display status command".

The GET status command 1520 includes a command 1522 for sending an XML Http request, and a command 1524 for executing the display status command 1530. The display status command 1530 includes a command 1532 for displaying the response with respect to the XML Http request. The command 1532 is a command for describing (writing) the response in the command 1540 described later (command for designating the display content of the portion 1410 of the main section 103). The status file 1500 includes a command 1540 that is specified with a status tag. The command 1540 is a command for designating the display content of the portion 1410 of the main section 103. Although not shown in FIG. 22, the status file 1500 additionally includes a command (command corresponding to the command 1212 of FIG. 14) for designating the display content of the menu section 102, a command for displaying the icon 1420 of the main section 103, and a command (command corresponding to the command 1242 of FIG. 14) for designating the display content of the footer section 104.

The PC 70 periodically executes the GET status command 1520 according to the timing described in the command 1510. The PC 70 sends a request for the status (status.txt) according to the command 1522 of the GET status command 1520. Then, the multi-function device 10 sends a response including the current status. The PC 70 executes the display status command 1530 according to the command 1524. Specifically, the PC 70 writes the status included in the response into the command 1540 according to the command 1532 included in the display status command 1530. Then, only the portion 1410 of the main section 103 is updated to the status included in the response and displayed. The PC 70 updates and displays only the portion 1410 without changing the contents other than the portion 1410. The web page 1430 shown in FIG. 21 is thereby displayed.

The multi-function system 2 of the third embodiment has been explained in detail. According to the third embodiment, the PC 70 is able to update only the portion 1410 of the main section 103 according to the display status command 1530 (refer to FIG. 22) of the status file 1500 and display the update thereof. The multi-function device 10 is not required to send data for updating the portions other than the portion 1410 upon sending the response to the request sent from the PC 70 according to the command 1522 (refer to FIG. 22) of the status file 1500. The multi-function device 10 is not required to send data for updating the entire web page, and only needs to send data that is required for the update of portion 1410. Thus, the load of the multi-function device 10 can be made small.

Fourth Embodiment

The fourth embodiment is now explained. The contents of the status file of the fourth embodiment differ from the contents of the status file of the third embodiment. FIG. 23 shows an example of a status file 1500*a* of the fourth embodiment. The command 1526 of the status file 1500*a* differs from the third embodiment. The command 1526 is a command for put the status (for example, "sleep" in the case of FIG. 20) to be displayed on the web page into the request to be sent according to the command 1522. Moreover, the command 1536 of the status file 1500*a* differs from the third embodiment. The command 1536 is a command for executing the command 1532 on a condition that the content of the response is not empty. Specifically, the command 1536 is a command for not executing the command 1532 if the content of the response is empty.

Figure 24:
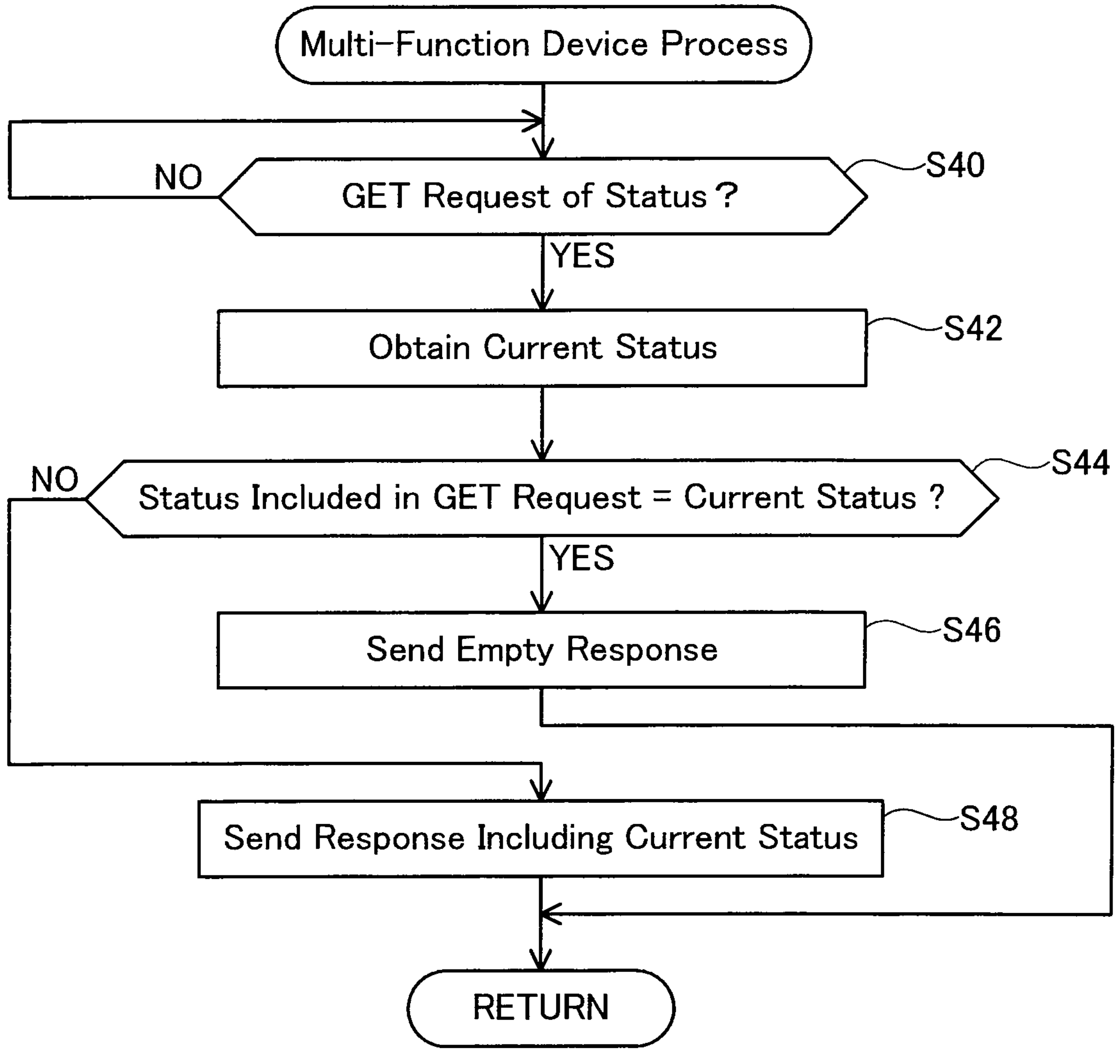
FIG. 24 shows a flowchart of the processing to be executed by the multi-function device.

The processing to be executed by the multi-function device 10 in the fourth embodiment is now explained. FIG. 24 shows a flowchart of the processing to be executed by the multi-function device 10 in the fourth embodiment. The multi-function device 10 is monitoring the reception of the GET request (S40). When the request sent from the PC 70 is received according to the command 1522 of FIG. 23, the determination is "YES" at S40. As described above, this request includes the status that is displayed on the PC 70 when this request has been sent.

If the determination is "YES" at S40, the multi-function device 10 acquires its own current status (S42). Subsequently, the multi-function device 10 determines whether the status included in the request received at S40 is identical to the status acquired according to S42 (S44). If the determination is "YES" in the foregoing case, the multi-function device 10 sends an empty response (S46). Specifically, the multi-function device 10 sends a response that does not include the status. In the foregoing case, the PC 70 does not execute the command 1532 since the condition of the command 1536 of FIG. 23 is not satisfied. As a result, the portion 1410 of the web pages 1400, 1430 is not updated. Meanwhile, if the determination is "NO" at S44, the multi-function device 10 sends a response including the status that was acquired at S42 (S48). In the foregoing case, the PC 70 executes the command 1532. Then, the portion 1410 of the web pages 1400, 1430 is updated to the status that is included in the response.

According to the fourth embodiment, the PC 70 can send a request including the status that is displayed on the web page according to the command 1526. The multi-function device 10 sends a response including the current status only in a situation when the status displayed on the web page is different from the current status of the multi-function device 10 (S48 of FIG. 24). The multi-function device 10 sends a response that does not include the status if the status displayed on the web page is different from the current status of the multi-function device 10 (S46 of FIG. 24). Specifically, the multi-function device 10 is not required to create a response including the status if there is no change in the status, and only needs to send an empty response. Thus, the load of the multi-function device 10 can be made small in this respect. Data of a large size, such as images, can be used as the data showing the status included in the response from the multi-function device 10. The multi-function device 10 is not required to send large-size data if there is no change in the status. The technology of the fourth embodiments is effective also from the perspective of reducing the load of the network between the multi-function device 10 and the PC 70.

Modified examples of the second to fourth embodiments are shown below. [0123] (1) The commands (for example, commands 1212, 1222, 1242, etc.) that are described in the index file 1020 may be included in the external file. Specifically, the index file 1020 may include, for example, in substitute for a specifically described command (such as commands 1212, 1222, 1242), a command for sending a request for the external file which includes the specifically described command (such as commands 1212, 1222, 1242). Moreover, the load file 1250 and/or the post file 1300 and/or the post request file 1330 does not have to be an external file. Specifically, the specifically described commands of these files 1250, 1300, 1330 may be described in the index file 1020.

[0124] (2) The commands (for example, commands 1520, 1530, etc.) described in the status files 1500, 1500*a* may be included in the external file.

Fifth Embodiment

The fifth embodiment is now explained. The fifth embodiment is broadly different from the second embodiment in the following ways. In the second embodiment, when any one of the character strings 106 to 112, 1124, 1126 (refer to FIG. 11, etc.) is clicked, the PC 70 sends a request corresponding to the clicked character string to the multi-function device 10. The multi-function device 10 sends a response including the setting input interface display data (reference numeral 1132 of FIG. 11, reference numeral 1190 of FIG. 13, etc.). Consequently, the PC 70 can update the display content of the main section 103 (or portion 1128). Meanwhile, the index file 1020*a* of the fifth embodiment includes all setting input interface display data. These setting input interface display data may be included in the index file 1020*a* in a form of an external file, or may directly be described in the index file 1020*a*. In the former case, the PC 70 sends a request for all setting input interface display data and acquires all setting input interface display data if the PC 70 receives the index file 1020*a* sent from the multi-function device 10. When the character strings 106 to 112, 1124, 1126 are clicked, the PC 70 specified the setting input interface display data corresponding to the clicked character string from the index file 1020*a*, and displays the specified setting input interface display data.

(Contents of Index File)

FIG. 25 shows an example of the contents of the index file 1020*a* in the fifth embodiment. The index file 1020*a* includes commands 2402, 2404, 2406 for acquiring the three external files. The command 2402 is a command for acquiring a file having a file name of "switch_page.js". In the ensuing explanation, this file is referred to as the "page file". The commands 2404, 2406 are the same as the commands 1204, 1206 (refer to FIG. 14) of the index file 1020 in the second embodiment.

The index file 1020*a* includes a command 2412 that is specified with a menu tag 2410. The command 2410 is a command for displaying the character strings 106 to 112 (refer to FIG. 10). The command 2410 includes a command 2414 for displaying a character string 108 of "FAX Settings", and a command 2416 for displaying a character string 110 of "Copy Settings". These commands 2414, 2416 differ from the commands 1214, 1216 (refer to FIG. 14) of the second embodiment in that the commands 2414, 2416 are commands for executing the function of "switchPage" when clicked.

The index file 1020*a* includes another command 2422 that is specified with a main tag 2420. The command 2422 includes a command 2432 that is specified with a FAX setting tag 2430. The command 2432 is a command for executing processing according to the post file 1300. Moreover, the command 2422 includes a command 2442 that is specified with a copy setting tag 2440. The command 2442 is a command for executing processing according to the post file 1300. In the fifth embodiment, the commands 2432, 2442 that are specified with the tag of the character string of "form" are provided with respect to each type of the settings (respective setting input interface display data 1132, 1190). Specifically, the command 2432 is provided regarding the setting concerning FAX, and the command 2442 is provided regarding the setting concerning copy. The index file 1020*a* includes a command 2452 that is specified with a footer tag 2450 as in the second embodiment.

In a state where the web page 1120 of FIG. 10 is displayed, the user can click the character strings 106 to 112 (refer to FIG. 10). In the foregoing case, the PC 70 executes the function of "switchPage" according to the command (for example, command 2414) corresponding to the clicked character string. This function is described in the page file having the file name of "switch_page.js" that is acquired according to the command 2402.

(Contents of Page File)

FIG. 26 shows an example of the contents of the page file 2500. The page file 2500 is described according to JavaScript (registered trademark). The page file 2500 includes a character string 2502 for specifying the function of "switchPage". The page file 2500 includes various types of commands 2504, 2506, 2508. The command 2504 includes a character string of "main", and this means that the main section 103 is being designated. The commands 2504, 2506 are commands for erasing the contents that are displayed on the main section 103. The command 2508 is designating "id". This "id" means the "main" that is designated in the command 2504. The command 2508 is a command for displaying the setting input interface display data corresponding to the clicked character strings 106 to 112 on the main section 103.

For example, if the user clicks the character string 108 (FAX Settings; refer to FIG. 10 to FIG. 13), the PC 70 executes the command 2502 that is described in the page file 2500 according to the command 2414 of FIG. 25. Specifically, the PC 70 switches the display content of the main section 103 to the setting input interface display data 1132 concerning FAX (refer to FIG. 11). Since the setting input interface display data 1132 concerning FAX is included in the index file 1020*a*, there is no need to send a request. The PC 70 updates only the main section 103 without changing the contents of the menu section 102 and the footer section 104.

Moreover, for instance, if the user clicks the character string 110 (Copy Settings; refer to FIG. 10 to FIG. 13), the PC 70 executes the command 2502 that is described in the page file 2500 according to the command 2416 of FIG. 25. Specifically, the PC 70 switches the display content of the main section 103 to the setting input interface display data 1190 concerning copy (refer to FIG. 13). In the foregoing case also, there is no need to send a request. The PC 70 updates and displays only the main section 103 without changing the contents of the menu section 102 and the footer section 104.

The processing to be executed when the user clicks the submit keys 1140, 1180 of FIG. 11 and FIG. 13 is the same as the processing in the second embodiment. As described above, in the index file 1020*a* (FIG. 25) of the fifth embodiment, the commands 2432, 2442 that are specified with the tag of the character string of "form" are provided with respect to each type of the setting input interface display data. Accordingly, in the fifth embodiment (as with the second embodiment), the POST request is sent in page units. For example, when the submit key 1140 is clicked in the setting input interface display data 1132 concerning FAX (refer to FIG. 11), a POST request including the setting data that has been input into the setting input interface display data 1132 is sent. Moreover, for instance, if the submit key 1180 is clicked in the setting input interface display data 1190 concerning copy (refer to FIG. 13), a POST request including the setting data that has been input into the setting input interface display data 1190 is sent.

Sixth Embodiment

In the fifth embodiment, the POST request is sent in page units. In the sixth embodiment, the PC 70 can send a POST request including the entire settings that that have been input in the plurality of setting input interface display data 1132, 1190. The index file 1020*b* for realizing this is now explained.

(Contents of Index File)

FIG. 27 shows an example of the contents of the index file 1020*b* in the sixth embodiment. The index file 1020*b* includes commands 2552, 2554, 2556 for acquiring the three external files. These commands 2552, 2554, 2556 are the same as the commands 2402, 2404, 2406 (refer to FIG. 25) of the index file 1020*a* in the fifth embodiment. Moreover, the commands 2562, 2564 are also the same as the commands 2414, 2416 (refer to FIG. 25) of the index file 1020*a* in the fifth embodiment.

The index file 1020*b* includes a save command 2560. The save command 2560 is a command for executing the function of "save". This function is described in a post file described later. Moreover, in the index file 1020*a* of the fifth embodiment, the FAX setting tag 2430 is associated with the command 2432, and the copy setting tag 2440 is associated with the command 2442. Meanwhile, in the index file 1020*b* of the sixth embodiment, one command 2572 (command for executing processing according to the POST file) that is specified with a tag 2570 of the character string of "form" is associated with both the FAX setting tag 2580 and the copy setting tag 2590. Specifically, the command 2572 is provided with respect to each type of the settings (each of setting input interface display data 1132, 1190).

(Contents of Post File)

The contents of a post file 2300*a* of the sixth embodiment are now explained. The page file 2500 that is acquired according to the command 2552 of the sixth embodiment is the same as the fifth embodiment, and the post request file 1330 that is acquired according to the command 2554 is the same as the second embodiment. FIG. 28 shows an example of the contents of the post file 2300*a*.

The post file 2300*a* includes a command 2620 to be executed according to the save command 2560 (refer to FIG. 27) of the index file 1020*b*. The command 2620 is a command for storing the setting data 1136, 1174, 1176 of the setting input interface display data 1132, 1190 (refer to FIG. 11 and FIG. 13) that are displayed when the user clicks the character strings 106 to 112, 1124, 1126 (refer to FIG. 10). Moreover, the command 2600 of the post file 2300*a* is a command for including only the setting data 1136, 1174, 1176, which have been changed in the setting input interface display data 1132, 1190 (refer to FIG. 11 and FIG. 13), into the POST request.

The user can switch the plurality of setting input interface display data 1132, 1190 (refer to FIG. 11 and FIG. 13) by clicking the character strings 106 to 112, 1124, 1126 (refer to FIG. 10). For example, the user can display the setting input interface display data 1132 (refer to FIG. 11), and thereafter display the setting input interface display data 1190 (refer to FIG. 13). In the foregoing case, the PC 70 stores the setting data 1136 ("Every 50 FAXes" in the example of FIG. 11) of the setting input interface display data 1132 and the setting data 1174, 1176 ("XXX" and "A4" in the example of FIG. 13) of the setting input interface display data 1190 according to the command 2620 of the post file 2300*a*. For example, the user can change the setting data 1136 of the setting input interface display data 1132 to "Every 100 FAXes", change the setting data 1174 of the setting input interface display data 1190 to "YYY", and click the submit key 1180 of the setting input interface display data 1190 without changing the setting data 1176 of the setting input interface display data 1190. In the foregoing case, the PC 70 includes the changed settings "Every 100 FAXes" and "YYY" into the POST request according to the command 2600 of the post file 2300*a*. The PC 70 does not include the setting data 1176, which was not changed, in the POST request.

The PC 70 can send the POST request to the multi-function device 10. The multi-function device 10 determines whether each of the plurality of setting data ("Every 100 FAXes" and "YYY" in the foregoing example) included in the POST request is applicable to itself (refer to S16 of FIG. 19). If an affirmative determination result is obtained regarding all setting data included in the POST request, the multi-function device 10 changes the corresponding memory contents of the setting storage area 32 (S18), and sends an affirmative response (S20). Meanwhile, if a negative determination result is obtained regarding at least one setting data that is included in the POST request, the multi-function device 10 sends an error response without changing any of the memory contents of the setting storage area 32 (S22).

Incidentally, if a negative determination result is obtained regarding at least one setting data that is included in the POST request while an affirmative determination result is obtained regarding the other setting data, the multi-function device 10 may store the other setting data whose applicability to the multi-function device 10 has been affirmed in the setting storage area 32. In the foregoing case, the multi-function device 10 may also send to the PC 70 the information concerning the setting data in which an affirmative determination result was obtained and/or the information concerning the setting data in which a negative determination result was obtained. The PC 70 may display the foregoing information on the main section 103. The user will thereby be able to know which setting data has been changed (or which setting data has not been changed).

According to the sixth embodiment, the PC 70 can collectively send the setting data 1136, 1174, 1176 that are input in a plurality of web pages to the multi-function device 10. Thus, the number of times that data is communicated between the PC 70 and the multi-function device 10 in order to change the settings of the multi-function device 10 can be reduced. Moreover, in the sixth embodiment, the PC 70 sends only the setting data 1136, 1174, 1176 that were changed by the user to the multi-function device 10. In comparison to the configuration in which the setting data 1136, 1174, 1176 that were not changed by the user is sent to the multi-function device 10, the size of data to be communicated will be smaller. In addition, in the foregoing case, the load required for the multi-function device 10 to analyze the POST request will also be smaller.

Modified examples of the fifth and the sixth embodiments are shown below. [0144] (1) The commands (for example, commands 212, 222, 242, etc.) that are described in the index files 20, 1020, 1020*a*, 1020*b* may be included in an external file. Specifically, the index files 20, 1020, 1020*a*, 1020*b* may include, for example, in substitute for a specifically described command, a command for sending a request for the external file which includes that the specifically described command. Moreover, the load file 1250 and/or the post file 1300 and/or the post request file 1330 does not have to be an external file. Specifically, the specifically described commands of these files 1250, 1300, 1330 may be described in the index files 20, 1020, 1020*a*, 1020*b*. *[*0145] (2) The command 2600 of FIG. 28 in the sixth embodiment is a command for creating a POST request including only the setting data 1136, 1174, 1176 that have been changed by the user. Nevertheless, the command 2600 of FIG. 28 may also be a command for creating a POST request including all setting data 1136, 1174, 1176 regardless of whether they have been changed by the user.

The preferred embodiments of the above-described printer of the first aspect are now explained. The second data needs to be described in a data format that can be interpreted by the web browser of the external apparatus (e.g., a PC). As an example of such a data format, the HTML format or the XHTML format can be considered. If the second data is described in either of said data formats, the web browser of the external apparatus can display a web page of a design according to the second data which the design to be displayed has been determined. Meanwhile, although the first data may be described in the HTML format or the XHTML format that does not include information concerning the design. Alternately, the first data may also be described in a data format that is neither the HTML format nor the XHTML format.

The command file may further include a fourth command for displaying a web page including at least a first portion and a second portion which is different from the first portion. The fourth command may include data for displaying an object in the first portion. The object is an object on which a predetermined operation is to be performed. The object may be text or an image. The first command may be a command for sending the request for the first data in a case where the predetermined operation is performed on the object. The third command may be a command for updating only the second portion in accordance with the second data.

According to the foregoing configuration, the external apparatus can display a web page in which the object is disposed in the first position according to the fourth command of the command file. The user can operate the object. In the foregoing case, the external apparatus sends a request for the first data according to the first command. Subsequently, the external apparatus can update only the second portion to the second data without changing the first portion and display the same according to the third command. The printer is not required to send data to be displayed on the first portion upon sending the response according to the request for the first data. This is because it is not necessary to update the first portion. In this configuration, the printer is not required to send data for updating the overall web page, and only needs to send the first data that is required for updating a part of the web page. The load of the printer can thereby be reduced. Incidentally, the following configuration may also be adopted in order to realize a function of updating only the second portion.

Specifically, the fourth command may include a first section in which data for determining a display content of the first portion is to be described, and a second section in which data for determining a display content of the second portion is to be described. In the command file, third data that a design to be displayed has been determined may be described in the first section. The third command may be a command for describing the second data in the second section. According to the foregoing configuration, the second data is described in the second section for determining the display content of the second portion, and then only the second portion is updated to the second data.

The command file storage unit may store a plurality of command files. Each of the plurality of command files may include mutually different design data (data for determining the design to be displayed). The command file sending unit may be configured to send, in a case where the receiving unit receives the request for one command file among the plurality of command files, the response including the one command file. With the foregoing configuration, a plurality of command files for displaying web pages of various types of designs are prepared in the printer. The user can send a request for a command file corresponding to the web page of the intended design from the external apparatus to the printer. A web page in the design intended by the user can be displayed on the external apparatus.

The command file may further include a command for sending a request for fourth data that is different from the first data. The second command may be a command for converting the first data into the second data according to the design data in a case where a response including the first data is received, and a command for converting the fourth data into fifth data according to the design data in a case where a response including the fourth data is received. The third command may be a command for displaying the web page according to the second data when the first data is converted into the second data, and a command for displaying the web page according to the fifth data when the fourth data is converted into the fifth data. According to the foregoing mode, whether the first data or the fourth data is obtained, the external apparatus can create data in which the design has been determined according to the same data (data for determining the design to be displayed).

The second data may be data for configuring the initial screen display of the web page. In the foregoing case, the first data can be reworded as data that is required for creating data to be used in configuring the initial screen display of the web page.

The second data may be setting display data showing the settings of the printer. In the foregoing case, the first data can be reworded as data that is required for creating the setting display data. The setting display data may also be setting input interface display data that allows the user to change the settings.

The fourth command may include data for displaying a plurality of objects in the first portion, the object is an object on which a predetermined operation is to be performed. The first command may be a command for sending the request for the first data in a case where the predetermined operation is performed on one object among a plurality of objects.

The correspondence of the printer of the first aspect of the present teachings and the multi-function device 10 of the first embodiment is indicated below. The first index file 20 and the second index file 22 are examples of the "command file" of the printer of the first aspect. The "top.xml" that is requested according to the command 218 of FIG. 6 and "configure_tcpip.xml" (XML file 250) that is requested according to the command 224 of FIG. 6 are examples of the "first data" of the printer of the first aspect. The command 204 of FIG. 5 to be executed according to the command 218 and the command 224 of FIG. 6 are examples of the "first command" of the printer of the first aspect. The command 212 of FIG. 5 is an example of the "second command" of the printer of the first aspect. The design data 213 included in the command 212 of FIG. 5 is an example of the "design data" of the printer of the first aspect. The design data 213 is data for causing the PC 70 to execute the flowchart of FIG. 9. The HTML data that is created from "top.xml" according to the command 212 of FIG. 6 and the HTML data that is created from "configure_tcpip.xml" according to the command 212 of FIG. 6 (XML file 250) are examples of the "second data" of the printer of the first aspect. The command 214 of FIG. 5 is an example of the "third command" of the printer of the first aspect. If "top.xml" is an example of the "first data", then "configure_tcpip.xml" is an example of the "fourth data" of the printer of the first aspect. If "configure_tcpip.xml" is an example of the "first data", then "top.xml" is an example of the "fourth data".

The menu section 102 and the footer section 104 are examples of the "first portion" of the printer of the first aspect. The main section 103 is an example of the "second portion" of the printer of the first aspect. The commands 222, 232, 242 of FIG. 6 are examples of the "fourth command" of the printer of the first aspect. The command 224 of FIG. 6 is an example of the "data for displaying an object in the first portion (the object on which the predetermined operation is to be performed)" of the printer of the first aspect. The character strings 106 to 112 of FIG. 2 are examples of the "object" of the printer of the first aspect. A click is an example of the "predetermined operation" of the printer of the first aspect. The commands 222, 242 of FIG. 6 are examples of the "first section" of the printer of the first aspect. The command 232 of FIG. 6 is an example of the "second section" of the printer of the first aspect.

The preferred embodiments of the printer of the foregoing second aspect of the present teachings are now explained. The first data may include a first section in which data for determining a display content of the first portion is described, and a second section in which data for determining a display content of the second portion is described. The third command may be a command for describing the third data in the second section. According to the foregoing configuration, the third data is described in the second section for determining the display content of the second portion, and then only the second portion is updated with the third data.

The first data may include a first object on which a predetermined operation is to be performed. The first object may be text or an image. In the foregoing case, the second command may be a command for sending the request for the third data in a case where the predetermined operation is performed on the first object. According to the foregoing configuration, the external apparatus can display a web page in which the first object is disposed in the first portion. When the operation is executed on the first object, the external apparatus can send a request for the third data, and update only the second portion with the third data.

The first data may include a plurality of first objects on which the predetermined operation is to be performed. The second command may be a command for sending, in a case where the predetermined operation is performed on one first object among the plurality of first objects, the request for the third data corresponding to the one first object. According to the foregoing configuration, the external apparatus can display a web page in which the plurality of first objects is disposed in the first portion. When the operation is executed on any one of the first objects, the external apparatus can send the request for the third data corresponding to the first object to which the operation was executed, and update only the second portion with the third data.

The printer may further comprise a fourth data sending unit. The second data may include a second object on which a predetermined operation is to be performed. The second object may be text or an image. The command file may further include a fourth command for sending a request for fourth data in a case where the predetermined operation is performed on the second object, and a fifth command for updating only a part of the second portion into the fourth data. The fourth data sending unit may be configured to send a response including the fourth data in a case where the receiving unit receives the request for the fourth data. According to the foregoing configuration, the external apparatus can display a web page in which the second object is disposed in the second portion. When the operation is executed to the second object, the external apparatus can send a request for the fourth data according to the fourth command. Subsequently, the external apparatus can update only a part of the second portion with the fourth data according to the fifth command. The printer is not required to send data to be displayed at portions other than said portion of the second portion (i.e., data of the first portion and data of portions other than said portion of the second portion) upon sending a response according to the request for the fourth data. This is because it is not necessary to update portions other than said portion of the second portion. The printer is not required to send data for updating the overall web page, and only needs to send the fourth data that is required for the update. The load of the printer can thereby be reduced.

There is no particular limitation to the contents of the third data. For example, the third data may be setting display data showing the settings of the printer. The setting display data may also be setting input interface display data that allows the user to change the settings. Moreover, for instance, the third data may be the status of the printer when the receiving unit receives the request for the third data. In the foregoing case, the following configuration may also be adopted.

Specifically, the printer may further comprise a determining unit. The second command may be a command for sending the request for the third data, the request including a status being displayed on the web page. The determining unit may be configured to determine, in a case where the receiving unit receives the request for the third data, whether the status included in the request for the third data is identical to the status of the printer at the time when the receiving unit received the request for the third data. The third data sending unit may send a response not including the third data in a case where the receiving unit receives the request for the third data and the determining unit makes an affirmative determination. The third data sending unit may send the response including the third data in a case where the receiving unit receives the request for the third data and the determining unit makes a negative determination.

According to the foregoing configuration, the external apparatus can send a request including the status of the printer that is displayed on the web page according to the second command. The printer sends a response including the current status (third data) only in a situation when the status displayed on the web page and its own current status are different. As a result, the external apparatus can display the latest status of the printer. The printer sends a response that does not include the status if the status displayed on the web page and its own current status are the same. Specifically, the printer is not required to create a response including the status if there is no change in the status, and only needs to send an empty response. Thus, the load of the printer may be made small.

One first object among the plurality of first objects may include a character string corresponding to the first type of the setting of the printer. The second command may be a command for sending a request for the third data concerning the first type of the setting in a case where the operation is executed to the first object corresponding to the first type of the setting. Another first object among the plurality of first objects may include a character string corresponding to the second type of the setting of the printer. The second command may be a command for sending a request for the third data concerning the second type of the setting in a case where the operation is executed to the other first object.

The first command may include a third section describing data for determining the display content of the part of the second portion. The fifth command may be a command for describing the fourth data in the third section. According to the foregoing configuration, the fourth data is described in the third section for determining the display content of the part of the second portion, and then only the part of the second portion is updated with the fourth data.

The correspondence of the printer of the second aspect and the second embodiment is indicated below. The index file 1020 is an example of the "command file" of the printer of the second aspect. The menu section 102 and the footer section 104 are examples of the "first portion" of the printer of the second aspect. The main section 103 is an example of the "second portion" of the printer of the second aspect. The character strings 106 to 112 and the description 116 (refer to FIG. 10) that are displayed according to the command 1212 and the command 1242 of FIG. 14 are examples of the "first data" of the printer of the second aspect. The character strings 1122 to 1126 (refer to FIG. 10) that are displayed according to the command 1222 are examples of the "second data" of the printer of the second aspect. The commands 1212, 1222, 1242 of FIG. 14 are examples of the "first command" of the printer of the second aspect. The command 1262 of FIG. 15 that is executed according to the commands 1214, 1216 of FIG. 14 is an example of the "second command" of the printer of the second aspect. The "fax_settings.html", "copy_settings.html" and the like that are requested according to the commands 1214, 1216 of FIG. 14 are examples of the "third data" of the printer of the second aspect. The command 1272 of FIG. 15 is an example of the "third command" of the printer of the second aspect.

The commands 1212, 1242 of FIG. 14 are examples of the "first section" of the printer of the second aspect. The command 1222 of FIG. 14 is an example of the "second section" of the printer of the second aspect. The character strings 106 to 112 of FIG. 10 are examples of the "first object" of the printer of the second aspect. A click is an example of the "predetermined operation" of the printer of the second aspect. The character strings 1124, 1126 of FIG. 10 are examples of the "second object" of the printer of the second aspect. The "set_audio_dial.html", "report_settings.html" and the like that are requested according to the commands 1224, 1226 of FIG. 14 are examples of the "fourth data" of the printer of the second aspect. The command 1282 of FIG. 15 that is executed by the commands 1224, 1226 of FIG. 14 is an example of the "fourth command" of the printer of the second aspect. The command 1292 of FIG. 15 is an example of the "fifth command" of the printer of the second aspect. The portion 1128 of the FIG. 10 is an example of the "part of the second portion" of the printer of the second aspect.

The correspondence of the printer of the second aspect and the third embodiment is indicated below. The status file 1500 is an example of the "command file" of the printer of the second aspect. The portions (menu section 102, footer section 104, etc.) other than the portion 1410 are examples of the "first portion" of the printer of the second aspect. The portion 1410 is an example of the "second portion" of the printer of the second aspect. The character strings 106 to 112, description 116, icon 1420 and the like (refer to FIG. 20) that are displayed according to the command that is specified with a "body" tag of FIG. 22 are examples of the "first data" of the printer of the second aspect. The character string 1412 (refer to FIG. 20) that is displayed according to the command 1540 of FIG. 22 is an example of the "second data" of the printer of the second aspect. The command that is specified with the "body" tag is an example of the "first command" of the printer of the second aspect. The command 1522 of FIG. 22 is an example of the "second command" of the printer of the second aspect. The "status.text" that is requested according to the command 1522 of FIG. 22 is an example of the "third data" of the printer of the second aspect. The command 1532 of FIG. 22 is an example of the "third command" of the printer of the second aspect. The portions other than the command 1540 among the commands that are specified with the "body" tag of FIG. 22 are examples of the "first section" of the printer of the second aspect. The command 1540 of FIG. 22 is an example of the "second section" of the printer of the second aspect.

The preferred embodiments of the printer of the foregoing third aspect of the present teachings are now explained. The first command may include a first section in which data for determining a display content of the first portion is to be described, and a second section in which data for determining a display content of the second portion is to be described. The third command may be a command for describing data corresponding to the response with respect to the setting change request in the second section. According to the foregoing configuration, the data corresponding to the response is described in the second section for determining the display content of the second portion, and then only the second portion is updated to the data corresponding to the response.

The first data may include an object on which a predetermined operation is to be performed. The object may be text or an image. The first command may include a fourth command for displaying the web page including the first portion on which the first data is located and the second portion, and a fifth command for updating only the second portion into the setting input interface display data in a case where the predetermined operation is performed on the object. According to the foregoing configuration, the external apparatus can display a web page including the first portion and the second portion. The first data (object) is disposed in the first portion of the web page. There is no particular limitation on the contents of the data to be disposed in the second portion (nothing may be displayed in the second portion). When the operation is executed to the object, the external apparatus can update only the second portion to the setting input interface display data.

The first data may include a plurality of objects on which the predetermined operation is to be performed. The fifth command may be a command for updating, in a case where the predetermined operation is performed on one object among the plurality of objects, only the second portion into the setting input interface display data corresponding to the one object. According to the foregoing configuration, the external apparatus can display a web page in which the plurality of objects is disposed in the first portion. When the operation is executed to any one of the objects, the external apparatus can update only the second portion with the setting input interface display data corresponding to the object to which the operation was executed.

The printer may further comprise a screen display data storage unit and a screen display data response sending unit. The screen display data storage unit may be configured to store a plurality of association data, in each of which a character string and the setting input interface display data are associated. The fifth command may include a sixth command and a seventh command. The sixth command is a command for sending, in a case where the predetermined operation is performed on one object among the plurality of objects, a screen display data request including a character string corresponding to the one object. The seventh command is a command for updating only the second portion into the setting input interface display data included in a response with respect to the screen display data request. The screen display data response sending unit may be configured to send, in a case where the receiving unit receives the screen display data request, a screen display data response including the setting input interface display data associated with the character string included in the screen display data request. According to the foregoing configuration, when the operation is executed any one of the objects, the external apparatus can send a request for the setting input interface display data corresponding to the object to which the operation was executed. The printer can send the setting input interface display data according to the request from the external apparatus.

The command file may include a plurality of setting input interface display data. The fifth command may be a command for switching, in a case where the predetermined operation is performed on one object among the plurality of objects, only the second portion with the setting input interface display data included in the command file and corresponding to the one object. The plurality of setting input interface display data may or may not be described in the command file. In the latter case, the command file may include a command for requesting the plurality of setting input interface display data (that is, an external file). This mode is also equivalent to the command file including the plurality of setting input interface display data. Even if adopting the configuration where the respective setting input interface display data are included in the command file, when the operation is executed to any one of the objects, the external apparatus can update only the second portion with the setting input interface display data corresponding to the object to which the operation was executed.

The second command may be a command for sending the setting change request including setting data input in accordance with the setting input interface display data corresponding to two or more objects. If adopting the configuration where the respective setting input interface display data are included in the command file, the external apparatus can collectively send the setting data input according to the setting input interface display data corresponding to two or more objects to the printer. According to this aspect, in comparison to the configuration of sending the setting change request with respect to each setting input interface display data, the number of times that the setting change request is communicated between the external apparatus and the printer can be reduced. Consequently, the communication load between the external apparatus and the printer can be reduced.

The fifth command may be a command for describing the setting input interface display data in the second section in a case where the operation is executed to the object. According to the foregoing configuration, the setting input interface display data is described in the second section for determining the display content of the second portion, and then only the second portion is updated to the setting input interface display data.

The second portion may include an object to which the predetermined operation is executed. The command file may also include a command for sending a request for the setting input interface display data in a case where the operation is executed to the object, and a command for updating only a part of the second portion to the setting input interface display data and displaying the same.

The setting input interface display data may include setting data that is set in the printer. Moreover, the setting input interface display data may also include a plurality of setting data that are set in the printer. In the foregoing case, the second command may be a command for sending a setting change request which includes the setting data that was changed by the user and which does not include the setting data that was not changed by the user. According to the foregoing configuration, since the setting data that was not changed by the user is not sent to the printer, the size of data to be sent from the external apparatus to the printer can be made small.

The correspondence of the printer of the third aspect and the second embodiment is indicated below. The index file 1020 is an example of the "command" file of the printer of the third aspect. The menu section 102 and the footer section 104 are examples of the "first portion" of the printer of the third aspect. The main section 103 is an example of the "second portion" of the printer of the third aspect. The character strings 106 to 112 and the description 116 (refer to FIG. 10) that are displayed according to the command 1212 and the command 1242 of FIG. 14 are examples of the "first data" of the printer of the third aspect. The setting input interface display data 1132 of FIG. 11 and the setting input interface display data 1190 of FIG. 13 are examples of the "setting input interface display data" of the printer of the third aspect. The commands 1260, 1270, 1280, 1290 of FIG. 15 that are executed according to the command 1212, 1222, 1242 of FIG. 14 and the commands 1214, 1216, 1224, 1226 of FIG. 14 are examples of the "first command" of the printer of the third aspect. The command 1332 of FIG. 17 is an example of the "second command" of the printer of the third aspect. The commands 1350, 1352 of FIG. 18 are examples of the "third command" of the printer of the third aspect.

The commands 1212, 1242 of FIG. 14 are examples of the "first section" of the printer of the third aspect. The command 1222 of FIG. 14 is an example of the "second section" of the printer of the third aspect. The character strings 106 to 112 of FIG. 10 are examples of the "object" of the printer of the third aspect. A click is an example of the "predetermined operation" of the printer of the third aspect. The commands 1212, 1222, 1242 of FIG. 14 are examples of the "fourth command" of the printer of the third aspect. The commands 1260, 1270, 1280, 1290 of FIG. 15 that are executed according to the commands 1214, 1216, 1224, 1226 of FIG. 14 are examples of the "fifth command" of the printer of the third aspect. The command 1262 included in the command 1260 and the command 1282 included in the command 1280 of FIG. 15 are examples of the "sixth command" of the printer of the third aspect. The command 1272 included in the command 1270 and the command 1292 included in the command 1290 of FIG. 15 are examples of the "seventh command" of the printer of the third aspect. The ROM 14 of FIG. 1 is an example of the "screen display data storage unit" of the printer of the third aspect. The file 22 ("fax_settings.html", "copy_settings.html", etc.) of FIG. 1 is an example of the "association data" of the printer of the third aspect.

The correspondence of the printer of the third aspect and the fifth embodiment is indicated below. Explanation of the same portions as the second embodiment is omitted. The index file 1020*a* is an example of the "command file" of the printer of the third aspect. The commands 2412, 2422, 2442 of FIG. 25 and command 2502 of FIG. 26 that is executed according to the commands 2414, 2416 of FIG. 25 are examples of the "first command" of the printer of the third aspect. The commands 2412, 2422, 2442 of FIG. 25 are examples of the "fourth command" of the printer of the third aspect. The command 2502 of FIG. 26 is an example of the "fifth command" of the printer of the third aspect.

What is claimed is:

1. A printer for use with an external apparatus, the printer having a web server function, the printer comprising:

a processor; and a memory configured to store one or more computer readable instructions, wherein the memory includes a command file storage configured to store a command file including:

a first command for causing the external apparatus to display a web page including a first portion in which first data is located and a second portion in which second data is located, a second command for causing the external apparatus to send a request for third data to the printer, and a third command for causing the external apparatus to update only the second portion with the third data;

wherein the one or more computer readable instructions, when executed by the processor, cause the printer to perform:

receiving a request from the external apparatus;

sending a response including the command file to the external apparatus in a case when a request for the command file is received from the external apparatus; and sending a response including the third data to the external apparatus in a case where the request for the third data is received from the external apparatus.

2. The printer as in claim 1, wherein:

the first command includes a first section in which data for causing the external apparatus to determine a display content of the first portion is to be described and a second section in which data for causing the external apparatus to determine a display content of the second portion is to be described, and the third command is a command for causing the external apparatus to describe the third data in the second section.

3. The printer as in claim 1, wherein:

the first data includes a first object being displayed on the web page on which a predetermined operation is to be performed in the external apparatus, and the second command is a command for causing the external apparatus to send the request for the third data in a case where the predetermined operation is performed on the first object.

4. The printer as in claim 3, wherein:

the first data includes a plurality of first objects being displayed on the web page on which the predetermined operation is to be performed, and the second command is a command for causing the external apparatus to send, in a case where the predetermined operation is performed on one first object among the plurality of first objects, the request for the third data corresponding to the one first object.

5. The primer as in claim 4, wherein the second data includes a second object being displayed on the web page on which a predetermined operation is to be performed in the external apparatus, wherein the command file further includes:

a fourth command for causing the external apparatus to send a request for fourth data in a case where the predetermined operation is performed on the second object; and a fifth command for causing the external apparatus to update only a part of the second portion with the fourth data, wherein the one or more computer readable instructions, when executed by the processor, cause the primer to further perform:

sending a response including the fourth data to the external apparatus in a case where the request for the fourth data is received from the external apparatus.

6. The printer as in claim 1, wherein:

the third data is a status of the primer at a time when the request for the third data is received from the external apparatus.

7. The printer as in claim 6, wherein the second command is a command for causing the external apparatus to send the request for the third data, the request including a status being displayed on the web page, wherein the one or more computer readable instructions, when executed by the processor, cause the printer to further perform:

determining, in a case where the request for the third data is received from the external apparatus, whether the status included in the request for the third data is identical to the status of the printer at the time when the request for the third data is received from the external apparatus; and sending a response not including the third data to the external apparatus in a case where the request for the third data is received from the external apparatus and it is determined that the status included in the request for the third data is identical to the status of the printer at the time when the request for the third data is received from the external apparatus, wherein the sending of the response including the third data is performed in a case where the request for the third data is received from the external apparatus and it is determined that the status included in the request for the third data is identical to the status of the printer at the time when the request for the third data is received from the external apparatus.

* * * * *